United States Patent
Pürstinger

[11] Patent Number: 6,066,288
[45] Date of Patent: May 23, 2000

[54] METHOD FOR COOLING AND IF NECESSARY CALIBRATING ARTICLES OF PLASTIC

[75] Inventor: Franz Pürstinger, Traun, Austria

[73] Assignee: C. A. Greiner & Sohne Gesellschaft mbH., Austria

[21] Appl. No.: 09/125,188

[22] PCT Filed: Feb. 11, 1997

[86] PCT No.: PCT/AT97/00025

§ 371 Date: Aug. 13, 1998

§ 102(e) Date: Aug. 13, 1998

[87] PCT Pub. No.: WO97/29899

PCT Pub. Date: Aug. 21, 1997

[30] Foreign Application Priority Data

Feb. 13, 1996 [AT] Austria ..................................... 249/96

[51] Int. Cl.[7] .................................................. B29C 47/90
[52] U.S. Cl. ...................... 264/568; 264/571; 264/209.4; 425/71; 425/72.1; 425/326.1
[58] Field of Search ..................... 264/568, 571, 264/209.3, 209.4, 28; 425/72.1, 326.1, 71

[56] References Cited

U.S. PATENT DOCUMENTS

| | | | |
|---|---|---|---|
| 4,029,452 | 6/1977 | Schippers et al. | 425/71 |
| 4,181,487 | 1/1980 | Kessler | 425/326.1 |
| 4,212,171 | 7/1980 | Soecknick | 62/63 |
| 4,401,424 | 8/1983 | DeZen | 425/388 |
| 4,452,752 | 6/1984 | Harder et al. | 264/555 |
| 4,654,094 | 3/1987 | Ritter | 156/80 |
| 4,755,118 | 7/1988 | Ondush et al. | 425/71 |
| 5,108,277 | 4/1992 | Dixon | 425/72.1 |
| 5,316,459 | 5/1994 | Melkonian et al. | 425/71 |
| 5,340,295 | 8/1994 | Preiato et al. | 425/71 |
| 5,525,289 | 6/1996 | Lupke et al. | 264/508 |

FOREIGN PATENT DOCUMENTS

| | | |
|---|---|---|
| 0 248 280 A2 | 12/1987 | European Pat. Off. . |
| 0 248 280 A3 | 12/1987 | European Pat. Off. . |
| 0 497 674 A1 | 5/1992 | European Pat. Off. . |
| 0 487 778 B1 | 6/1992 | European Pat. Off. . |
| 0 659 536 A2 | 6/1995 | European Pat. Off. . |
| 0 659 536 A3 | 6/1995 | European Pat. Off. . |
| 0 659 537 A2 | 6/1995 | European Pat. Off. . |
| 1923490 | 11/1970 | Germany ............... 264/209.4 |
| 1 936 428 | 6/1971 | Germany . |
| 40 38 447 A1 | 6/1992 | Germany . |
| 195 04 981 | 8/1995 | Germany . |

*Primary Examiner*—Jan H. Silbaugh
*Assistant Examiner*—Stefan Staicovia
*Attorney, Agent, or Firm*—Alston & Bird LLP

[57] ABSTRACT

A method for cooling and if necessary calibrating elongate articles 7 of plastic, in which the article 7, during its continuous progress has flowing round it only a gaseous cooling medium 42 at a temperature of less than 100° C. at least over a portion of its outer surface and extending over a pre-determinable length of the article 7, in a plurality of flow areas 25–35' separate from one another and located one behind the other in the extrusion direction, arrow 5.

51 Claims, 18 Drawing Sheets

METHOD FOR COOLING AND IF NECESSARY CALIBRATING ARTICLES OF PLASTIC

SUMMARY OF THE INVENTION

The object underlying the present invention is to improve the strength properties of extruded articles with the best possible utilization of the energy outlay, or to keep to a minimum the manufacturing or operational costs of devices for cooling and if necessary calibrating such extruded articles.

The object of the present invention is in particular achieved by one embodiment of the invention in which the article, during its continuous forward progress, has only a gaseous cooling medium at a temperature of less than 100° C. flowing around and/or over it in a plurality of flow areas in succession in the extrusion direction and separated from one another, and which extend at least over a portion of the outer surface of the article. Of advantage in this embodiment is that by means of the use of gaseous coolant, other volume portions of the coolant permanently come into contact with the surface of the article to be cooled, the cooling result or the cooling effect being additionally increased by the fact that the cooling medium is transported away transversely or obliquely to the extrusion direction over the article, or flows round the article. A further advantage of the use of a gaseous cooling medium resides in the fact that this can be cooled to substantially lower temperatures than for example a liquid cooling medium such as water, and thus coolant media with temperatures of below 0° C. can be used. Also, the energy outlay for passing the cooling medium through the system is less in the case of a gaseous as compared to a liquid cooling medium, and a higher vacuum can be built up in the flow areas with less propulsive power. Because the coolant flows about the article in a direction obliquely or transversely to the extrusion direction of the article, on the other hand there is also achieved in an advantageous way a uniform cooling around an entire cross-section of the article, so that the articles are also capable of higher load. A surprising advantage of the present solution resides in the fact that due to the intense and rapid cooling of the article, in particular in the case of hollow profiles, the thermal activity in the inner space is decisively influenced and thus cooling of the portions of the profile lying in the inner space of the whole profile can be effected more rapidly. This rapid cooling of the inner space is also reinforced by the fact that the intensely cooled outer periphery of the profile acts as a so-called cold store and thus the heat still contained in the webs is given off or transmitted to this intensively supercooled outer periphery. A further advantage in the use of a gaseous coolant arises from the fact that, as it passes along the article to be cooled, no residues adhering to the profile, such for example as lubricants, impurities or the like, are released or washed off, which otherwise are given off without filtering to the environment by the coolant used, such for example as water. Due to the preferably enclosed coolant circuit, stress on the environment is reliably avoided, and any impurities occurring can be separated by a filter device.

In a further embodiment of the invention, in the individual flow areas which extend in a plane vertical to the extrusion direction, the cooling medium flows round the article in a first flow area in the circumferential direction, whereafter the cooling medium is conveyed onwards into a flow area directly following in the extrusion direction, and in this the cooling medium again flows round the article in the circumferential direction. In this way, a corresponding flushing and entailed heat removal from the article to be cooled is achieved in each of the individual flow areas, and a directed further transport of the coolant is effected between the individual flow areas.

Furthermore, a procedure in which the flow direction of the gaseous cooling medium is aligned identically in flow areas directly succeeding one another is advantageous, as in all an almost helical flushing of the article by the coolant can be achieved, in order to avoid curvatures in the longitudinal direction of the profile to be cooled.

Also of advantage however is a further procedure in which the flow direction of the gaseous cooling medium is aligned in an opposite direction in the flow areas immediately succeeding one another, as in this way temperature differences due in cooling are equalized by heating of the cooling agent in successive flow areas as the article is flushed in one flow area, and thus a uniform removal of energy from the article is achieved over the entire external periphery of the article or of the profile.

In a further embodiment, a spacing or the cross-sectional width of the layer of the cooling medium flowing round the article is roughly identically large in the plane lying vertically to the extrusion direction, over the flow area, or fluctuates from the spacing by only a fraction. In this way, it is ensured that a continuous exchange is effected with the portions of the gaseous coolant coming into contact with the outer surface of the article, so that uniformly high flow speeds are achieved, leading to a better heat removal in the area of the outer surface of the article to be cooled.

In yet another embodiment, in flow areas succeeding one another in the extrusion direction, the vacuum in the cooling medium is different, and thus the shaping for the external shape of an article can be adapted to the respective requirements as regards wall thickness and temperature behavior and the like for the article.

By causing the vacuum in the flow areas succeeding one another in the extrusion direction to become higher as the distance from the shaping of the article in the extrusion direction increases, due to the low vacuum at the beginning of the cooling procedure, unnecessary inflation of the profile is prevented, in this way ensuring sufficient dimensional stability of the article passing through the cooling device.

Also of advantage is a further embodiment in which the increase in the vacuum between the immediately successive flow areas takes place continuously and is higher by 0.002 bar −0.1 bar in the extrusion direction in the successive flow area relative to the immediately preceding flow area as, due to the constant increase in the vacuum, the article during its cooling within the cooling device is exposed to a continuously increasing vacuum, so that due to the progressive cooling and the hardening entailed therewith, a high dimensional stability of the article can be achieved.

Inflation of the profile in the entry area into the cooling device is prevented in another embodiment in which the article is exposed in the entry area to a vacuum between 0 bar and −0.1 bar and in the outlet area to a vacuum between −0.01 bar and −0.5 bar, as the still highly viscous article is exposed in the entry area into the cooling device to a very small vacuum, and only with progressive cooling and the entailed hardening can the vacuum be correspondingly increased.

By means of the selection of the speed of the air movement, and more particularly by causing the cooling medium to be passed through the cooling device at a speed between 0.001 m/sec and 0.3 m/sec, preferably between 0.01 m/sec and 0.1 m/sec, a correspondingly high heat removal can be achieved from the article to be cooled.

In another embodiment of the invention, a flow speed of the flowing medium in the flow area is less than in the area of a pipe connection between two flow areas. In this manner, the coolant enters the flow area at a higher speed and therefore improved turbulence and a higher frequency of contact between the various volume portions of the coolant and the article are achieved.

According to still another embodiment, the cooling medium entering the flow area is separated from the cooling medium leaving the flow area. Accordingly, mixing of the entering and emerging coolant and thus a continuous flushing of the article are advantageously achieved.

Also of advantage is a solution according to which a quantity of cooling medium which flows round the article in the flow area, is a multiple of that part quantity of the cooling medium which passes through a slot between the article and a longitudinal web, which separates the cooling medium entering the flow area from the cooling medium leaving it, as in this way in fact damage to the article in the region of its surface is eliminated, yet the predominant cooling effect is achieved on a large part of the outer surface of the article.

In a further embodiment according to the invention, the cooling medium flows successively through the individual flow areas succeeding one another in the extrusion direction. Thus, a continuously increasing vacuum is built up automatically in the through-flow direction, without additional measures, and a simple structural apparatus for carrying out the method is achieved.

A rapid withdrawal of heat energy from the article to be cooled is achieved by cooling the cooling medium to a temperature of less than 0° C., preferably −15° C. to −30° C.

The cooling effect or the path length over which the cooling according to the invention must be effected, is shortened by a procedure in which the cooling medium is cooled in the individual flow areas and/or between these with a coolant at a temperature of less than 0° C., preferably between −15° C. and −40° C.

By means of a further process variant in which the cooling medium is cooled outside the flow areas, a lower flow resistance is opposed to the coolant passing through the cooling device, so that a higher cooling performance can be achieved.

In accordance with an additional embodiment, the cooling medium is passed from the last flow area lying in the extrusion direction, if necessary with cooling, back to the flow area lying nearest to the extrusion tool. Hence, energy loss due to the withdrawal of unused coolant is prevented, and in addition the stress on the environment is kept to a minimum by the present method.

Uniform cooling of the article can be achieved in a simple way by causing a flow speed of the cooling medium to be higher than a feed speed of the article in the extrusion direction, as in this way each of the individual part areas of the article passes into ensured contact with the coolant and thus ensured heat withdrawal is achieved from the profile to be cooled to the coolant.

An undisturbed and gentle cooling of the article can however also be achieved by a process procedure in which the cooling medium flows round the article in the extrusion direction in a roughly spiralling form.

Advantageous variants of the procedure are also provided wherein a vacuum is built up in the flow areas, and the cooling medium present in the evacuated area, independently of the generation and maintenance of the vacuum, is circulated a number of times in a predetermined period, the circulated quantity of cooling medium corresponding to a multiple of the quantity of cooling medium transported through the flow areas in order to maintain the vacuum. Preferably, the quantity of cooling medium circulated in the evacuated flow areas comes to between 50 $m^3/h$ and 600 $m^3/h$, preferably between 100 $m^3h$ and 300 $m^3/h$. Thus, on the one hand a high throughput of coolant through the cooling device can be set and thus a high degree of cooling of the article achieved, and on the other hand the build-up of vacuum in the individual flow areas can be set independently thereof in a regulating circuit separated therefrom.

In yet further embodiments, the article has the cooling medium flowing round it with a turbulent flow in the area of its outer surface, and more particularly the cooling medium flows on and/or around the article in the flow areas in an angular, particularly transverse fashion relative to the extrusion direction. Hence, an even higher heat transfer from the article to be cooled to the cooling medium flowing around it can be effected, as due to the flow direction and the turbulent flow selected in this case on the surface of the article, a frequent exchange of partial volumes of the coolant is effected thereon. Due to this frequent exchange of coolant, rapid heat withdrawal from the article to be cooled is possible.

The object of the present invention is also however achieved by a device, comprising at least one cooling chamber, the casing of which is made up of end walls, a base plate, side walls and a cover plate, and having the casing subdivided by a plurality of support baffles into a plurality of flow areas located one behind the other in a longitudinal direction extending vertically to the end walls, the support baffles and the end walls being provided with an aperture which corresponds to a cross-sectional shape or profile contour of the article, and wherein a cooling medium flows through the inner space of the cooling device from the inlet area to the outlet area. At least two flow areas are connected together in the longitudinal direction by a pipe connection, and a flow area is connected by a discharge pipe to a vacuum pump, and each of the flow areas is subdivided by a longitudinal web between the article and the casing into at least two sections, and the sections on the side of the article lying opposite the longitudinal web are connected together via a duct. The cooling medium is formed by a gas and a cooling device for the cooling medium is located in the inner space of the cooling device, and an inflow temperature of the cooling medium into the flow area is less than 100° C., and the two sections are located in the flow area parallel to one another extending in the longitudinal direction, each of the two sections being connected via a pipe connection either with a section of an immediately preceding flow area or a feed pipe, and the other section is connected to a section of a flow area succeeding it in the longitudinal direction, or to a discharge pipe. An advantage in this device is that, with one single cooling medium flowing through, both the reduced pressure in the device due to the coolant and simultaneously a cooling of the article can be achieved. In addition, now in a surprising way operation can be with extremely low temperatures of the coolant, so that more rapid consolidation of the outer surface of the article is achieved and thus the risk of surface damage during the further calibration can be reduced. In addition, due to the intense cooling of the outer periphery of the article to be cooled, a heat transfer proceeding from the hot inner space with the webs located therein, towards the super-cooled outer periphery is achieved. Due to this heat transfer, heating of the outer periphery occurs, which is however less than the crystallization temperature or softening temperature of the plastic material. Thus inaccurate dimensions even in the area of cross webs on the profile surface are avoided.

In another embodiment of the invention, insulating members are located in the inner space of the casing. Thus, on the one hand a favorable flow of the cooling medium round the article is achieved and on the other hand the introduction of additional heat from the environment of the cooling device to the cooling medium is prevented.

Also of advantage is an embodiment in which a spacing between an outer surface of the article and the casing and/or the insulating members is roughly of equal size at least over a part area at least over a larger portion of the profile contour of the article between the two sections, due to which a flushing duct with a roughly equally large cross-sectional area is provided in the flow area, so that a uniform flow speed and thus an exactly predeterminable heat exchange can be achieved for the entire outer surface of the article.

A situation can further be achieved with advantage by providing a plurality of flow areas located in the longitudinal direction parallel to one another over the profile contour of the article between two support baffles located in succession in the longitudinal direction, in that only a portion of the article is flushed in each flow area, so that an improved heat withdrawal from the article can be achieved.

Another embodiment of the invention has the flow areas separated from one another between the casing and the article by a plurality of longitudinal webs. With this device, it is now possible precisely to determine or subdivide the volume of the article to be cooled in the respective flow area.

In yet another embodiment, a cooling member is located between the article and the casing or the insulating member in the area of a duct. The design thus provides that as far as possible over the entire flow area a uniform temperature of the coolant and thus an improved cooling effect can be achieved. Moreover, in this way an improved heat transfer from the article to be cooled to the coolant flowing through it is achieved, as immediately after the take-up of heat by the coolant, a release of this quantity of heat is effected to the additional cooling member.

In the constructive variant, the pipe connection between two flow areas lying one behind the other in the longitudinal direction is formed by a flow duct. Thus, a short pipe guidance is provided for supplying the flow areas with coolant, so that the flow and cooling losses are relatively small.

A uniform withdrawal of heat from the article to be cooled by the coolant flowing through can be achieved by embodiments of the invention having various arrangements of the cooling device for cooling the cooling medium. For example, in one embodiment, there is located in the flow duct a cooling member of the cooling device for the cooling medium. In another embodiment, the longitudinal web that separates the flow area into two sections is in the form of a cooling member. According to a further embodiment, a cooling member of the cooling device is located in each of the two sections. In yet another embodiment, the cooling member of the cooling device is located between two support baffles defining the flow area. Still another embodiment is configured such that the cooling member of the cooling device extends in the longitudinal direction over a plurality of flow areas located one behind the other.

An enclosed construction of the device can in particular be achieved by an embodiment in which the pipe connection is formed by an aperture between a separating wall, the support baffle and the casing.

The build-up of vacuum in the inner space of the cooling device and also the heat removal from the article can be achieved in a rapid and simple manner by various embodiments of the invention in which a vacuum between the individual flow areas continuously increases from the entry area to the exit area. Preferably, the vacuum in one flow area immediately subsequent to a flow area in the extrusion direction is higher by 0.002 bar to 0.1 bar. In one embodiment, the vacuum in the entry area comes to between 0 bar and −0.1 bar, and in the exit area to between −0.1 bar and −0.5 bar. Further, a flow speed of the cooling medium through the cooling device comes to between 0.001 m/sec and 0.3 m/sec, preferably between 0.01 m/sec and 0.1 m/sec. Advantageously, the cooling medium has in the flow area a temperature of less than 0° C., preferably −15° C. to −30° C.

An extremely robust design, which leads to no corrosion even after a lengthy operational period is achieved by making the support baffles and/or the base plate of a casing from steel.

Precise monitoring of the cooling procedure can be achieved by a design in which the side walls and the cover plate of the casing as well as the longitudinal web and the separating walls are made of plexiglas.

A high cooling performance of the cooling members or an intensive heat exchange can be achieved by a further development in which the cooling member is filled with a coolant. In one embodiment, the cooling member is formed by a cooling tube for a coolant, with cooling fins mounted on the cooling tube.

Finally it is now possible to achieve, even in hollow spaces of hollow-profile-like articles, a more rapid cooling and a helical-shaped transport of cooling air by virtue of further advantageous embodiments of the invention in which there is located in an end wall extending vertically to the extrusion direction of the extrusion tool, within a hollow space surrounded by the nozzle slot, an inlet for a suction pipe connected to the suction inlet of an evacuation device. Preferably, in one embodiment, the suction pipe is passed through the extrusion tool with an interposed heat insulation. Advantageously, the inlet into the suction pipe is located in the extrusion direction, at a spacing in front of the nozzle lip. The rapid cooling effects are achieved on the one hand by the natural "thermal activity" in the hollow spaces of the profile due to the varying temperatures of the individual side walls of the hollow chambers, and on the other hand the cooling is accelerated by the fact that the air suctioned in this way into the hollow cavity of the article is cooled so far in the areas most remote from the extrusion tool, and in which the article has an extremely low temperature, that it can then still withdraw a sufficient quantity of heat from the article even in the vicinity of the calibrating tools.

The invention will be explained in more detail in the following with reference to the various constructive variants, if necessary independent in themselves, illustrated in the drawings.

BRIEF DESCRIPTION OF THE DRAWINGS

Shown are.

It should be noted initially that in the various embodiments described, identical parts are provided with identical reference numbers or identical component titles, and the disclosures contained in the entire description may logically be transferred to identical parts with identical reference numbers or identical component titles. Furthermore, individual features from the various embodiments shown can in themselves represent independent solutions according to the invention.

Figure 1:
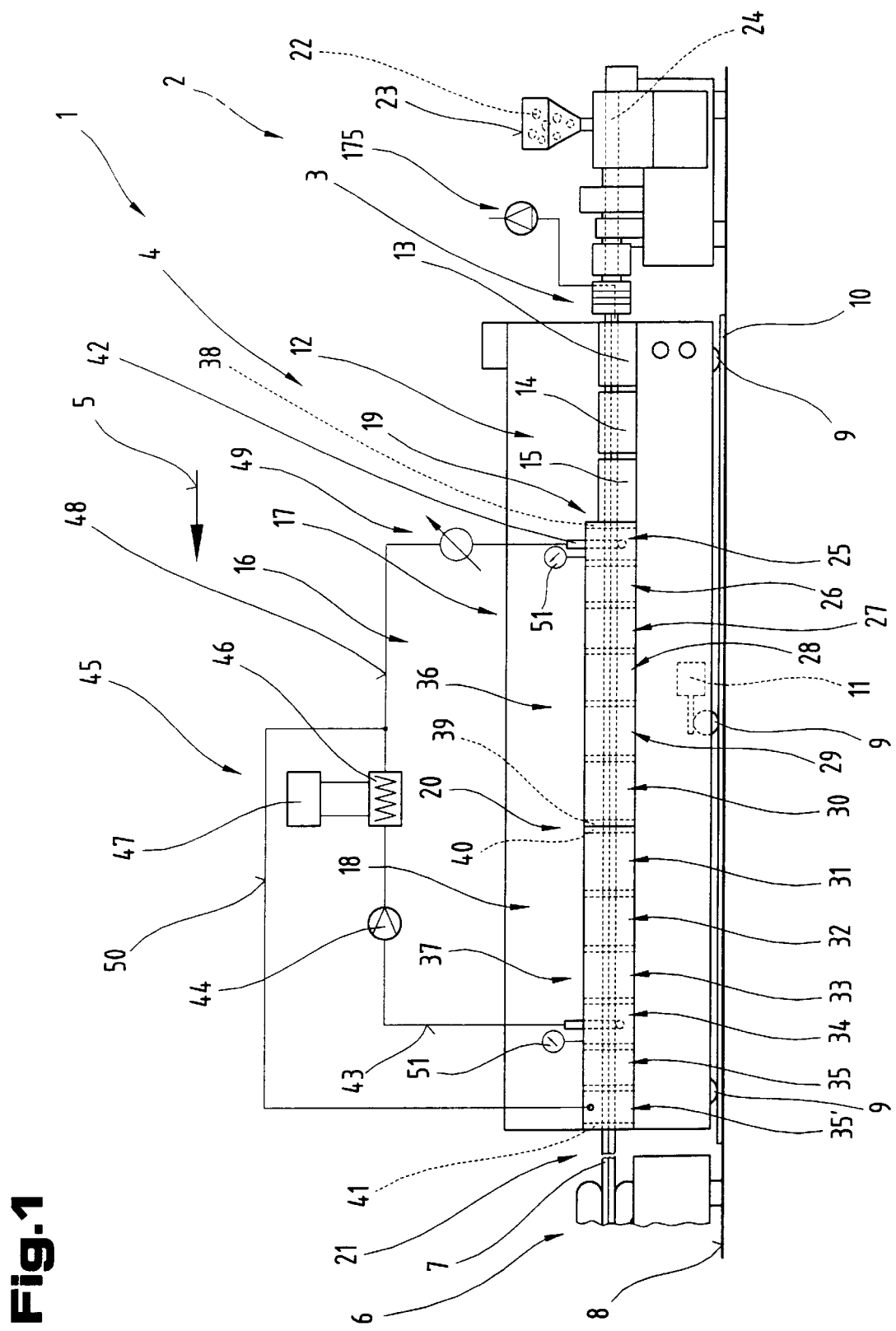
FIG. 1: an extrusion installation with a cooling device and if necessary calibrating device according to the invention, in side elevation and in a simplified schematic view.

FIG. 1 shows an extrusion installation 1, comprising an extruder 2, followed by an extrusion tool 3 which is in turn followed by a calibrating table 4. In the extrusion direction, arrow 5, the calibrating table 4 is followed by a caterpillar pull-off 6 which is shown schematically and in a simplified manner, by means of which an article 7, for example a profile of plastic for window construction, can be withdrawn from the extrusion tool 3. The extruder 2, the calibrating table 4 and the caterpillar pull-off 6 and further arrangements and devices following these, such for example as saws and the like, are mounted on a support surface 8 shown schematically, and are supported thereon.

Furthermore, it is schematically indicated in the area of the calibrating table 4, that the latter is mounted to be displaceable longitudinally via rollers 9 in a mobile manner on a travelling rail 10 in the extrusion direction, arrow 5. In order to be able to executive this displacement movement more simply and accurately, for example there is associated with one of the rollers 9 a displacement drive 11, which permits a deliberate and controlled longitudinal movement of the calibrating table 4 towards the extruder 2 or away from the extruder 2. Any solutions known from prior art may be used for propulsion and control of this displacement drive 11.

The calibrating table serves to accommodate or secure further arrangements or devices shown between the extrusion tool 3 and the caterpillar pull-off 6. Thus, immediately following the extrusion tool 3 in the extrusion direction, arrow 5, there is a calibrating device 12, such for example as a vacuum calibration device, secured on the calibrating table 4. This calibrating device 12 is formed in the present embodiment from 3 successive calibrating tools 13–15 in which calibration of the extruded article 7 is carried out in a known way. Thus the arrangement of the vacuum slot, of the cooling sections and cooling bores and their connections can be constructed in accordance with known prior art.

Immediately following the calibrating tool 15 of the calibrating device 12 is a cooling device 16, which if necessary is also simultaneously usable as a calibrating arrangement, which in this embodiment is formed from two successive cooling chambers 17 or 18. It is naturally also possible to design the cooling device 16 as one single cooling chamber, in order to satisfy the necessary requirements of cooling. This depends on the application and field of use of the cooling device 16, on the article 7 to be cooled and on the circumstances of space.

In an area facing the calibrating tool 15 of the calibrating device 12, the cooling chamber 17 has an entry area 19 for the article 7. Located between the two cooling chambers 17 or 18 is a transitional area 20, which ensures a sealed transmission from the cooling chamber 17 into the cooling chamber 18. At the end of the cooling chamber 18, seen in the direction of extrusion, arrow 15, there is located an outlet area 21 for the article 7 towards the caterpillar pull-off 6. If for example only one of the cooling chambers 17 or 18 is provided, the transitional area 20 represents either an outlet area or an inlet area.

The plasticised and correspondingly shaped article 7 emerging from the extrusion tool 3 consists of a plastic material 22, which is stored in granulate or powder form in a storage container 23 of the extruder 2, and is correspondingly softened or plasticised by means of one or a plurality of conveyor worms 24 in the extruder 2, and is then carried out of the extrusion tool 3. This plasticised plastic material 22 after emergence from the extrusion tool 3 has a cross-sectional shape determined by the extrusion tool 3, which is correspondingly calibrated and/or cooled in the following calibration device 12, until the highly viscous article 7 has been superficially cooled until its external shape is stable and is formed in accordance with its dimensions. After the calibrating device 12, the article 7 passes through the cooling device 16, in order to achieve a further corresponding cooling and if necessary calibration, and in order to establish the final cross-sectional shape of the article 7. The cooling chamber 17 in this case is subdivided into a plurality of flow areas 25–30 located one behind the other in the extrusion direction, arrow 5, and the cooling chamber 18 likewise into a plurality of flow areas 31–35' located one behind the other in the extrusion direction, arrow 5. The subdivision of the cooling chamber 17 or 18 into various flow areas is indicated only schematically, the number or also the conditions of size of the flow areas 25–35' being given only by way of example.

The two cooling chambers 17 or 18 are respectively formed by an air-tight casing 36 or 37, an end wall 38 being associated with the entry area 19, an end wall 39 with the transitional area 20 for the cooling chamber 17, and an end wall 40 with the cooling chamber 18, and finally an end wall 41 being associated with the entry area 21 of the cooling chamber 18.

There is used as a cooling medium 42 a gaseous medium which has been cooled to a corresponding temperature. For example there may be used as a gaseous cooling medium 42 ambient air which can for example be cleaned, filtered etc., or also a medium which at temperatures below 0° C. or –5° C. has a high heat capacity, which in the present embodiment is passed to the flow area 25 immediately following the calibrating device 12, and thereupon flows through the cooling chamber 17 or 18, the article 17 to be cooled being correspondingly cooled. The flow of the cooling medium 42 through the two cooling chambers 17 or 18 will be described in more detail in the following embodiments, these being capable if necessary of representing independent solutions according to the invention for the cooling device or if necessary calibrating device 16.

As is further to be seen from this view, the flowing cooling medium 42 is suctioned out of the cooling device 16, for example in the flow area 34 of the cooling chamber 18, by means of a schematically indicated discharge pipe 43 into a discharge area, or is conveyed through the cooling device 16 by a circulating device such for example as a fan, a turbine or a vacuum pump 44. Following the vacuum pump 44 is a schematically indicated cooling device 45 consisting of a heat exchanger 46 and associated therewith a cooling unit 47. In the heat exchanger 46 the flowing gaseous cooling medium is correspondingly cooled and passed via a charge pipe 48 in turn to the first flow area 25 of the cooling chamber 17 in an inlet area. However an open circuit for the throughflow of the cooling medium through the cooling device 16 is also possible, in which the supplied medium is cooled outwith the cooling device 16 and thus is passed to the inner cavity of the casing 36, 37. Suction removal of the cooling medium is thus effected in an arrangement separate therefrom. This solution is in fact imaginable, but is rather unfavourable from the economic point of view, as fresh cooling medium 42 must continually be prepared, in order to be used according to the invention.

Thus the vacuum build-up within the cooling device 16 so designed that the vacuum built up therein continuously increases in the directly succeeding flow areas 25–35', the flow direction of the cooling medium 42 through the cooling device 16 being the same as the extrusion direction, arrow 5. In this way the cooled medium, which in the inlet area of the cooling chamber 17 has for example a temperature of less than 100° C., but more preferably less than 0° C., and still more preferably between –15° C. and –30° C., is passed to the still extremely hot article 7, in order to achieve an optimum and rapid cooling of the same. It is however naturally also possible to select the flow direction of the cooling medium 42 through the cooling device 16 as opposite to the extrusion direction, arrow 5, should this be necessary or better for specific requirements for the article 7 to be cooled. The extrusion direction, arrow 5, forms for the casings 36, 37, the article 7 and the calibrating device 12, a longitudinal direction or longitudinal contour.

In order to be able correspondingly to adjust the vacuum build-up within the cooling device 16, there is located in the area of the feed pipe 48 a regulating device 49, for example a throttle, by means of which the vacuum generated within the cooling device 16 can be varied or adjusted, the quantity of coolant to be suctioned by the vacuum pump 14 being for example reduced. In this respect it has proved advantageous if the vacuum in the flow area 25 is still extremely low, for example between 0 bar and –0.1 bar, and is higher by 0.002 to 0.1 bar per flow area, and in the area of the outlet area 21 comes to between –0.1 bar and –0.5 bar, preferably –0.2 bar.

Due to this small degree of vacuum in the inlet area 19 of the cooling chamber 17, the still highly viscous article 7 is not exposed to excessively high degree of vacuum so that an alteration in shape cannot occur due to the vacuum. Due to the further cooling of the article 7 passing through the cooling device 16, the vacuum can increase correspondingly from flow area to flow area, as consolidation and thus rigidification occurs with the continuing cooling.

In order to compensate for corresponding leakage losses or excess of cooling medium 42 in connection with the cooling device 45 and correspondingly in the cooling device 16, proceeding from the feed pipe 48 there is provided an additional pipe 50, which opens into the flow area 35' of the cooling chamber 18, i.e. into that area which lies closest to the outlet area 21 from the cooling device 16, and which likewise feeds cooling medium 42 thereto. Thus in this embodiment the two flow areas 35 or 35' adjacent to the outlet area have relative to the preceding flow areas 25–34, no low pressure nor a vacuum built up therein. Further possible arrangements of the cooling devices 45 or also further cooling systems will be described in more detail in the following Figs.; it should be noted that these further embodiments can either in themselves represent independent designs according to the invention or may be used also in combination with other embodiments.

In order to be able correspondingly to monitor the vacuum built up by the vacuum pump 44 within the cooling device 16 in the individual flow areas 25–34, there may be associated either with each flow area or only individuals thereof a display instrument 51, such for example as a manometer, by means of which the vacuum continuously building up in the extrusion direction, arrow 5, can be read off or monitored, and can be set by the regulating device 49 and thus monitored.

FIGS. 2–6 show a design, if necessary independent in itself, of a cooling chamber 17 of the cooling device 16, identical parts having identical reference numbers to those in FIG. 1. It should be mentioned that the design or construction here described for the cooling chamber 17 can also logically be valid for the following cooling chamber 18.

A casing 36 of the cooling chamber 17 is preferably gas-tight and in design and consists of a cover plate 52, a base-plate 53, side walls 54, 55 arranged therebetween, and, located in the entry area 19 or transitional area 20, end walls 32 or 39, which thus form or enclose an inner space 56.

The individual flow areas 25–30 between the end walls 38 or 39 of the cooling device 16 or cooling chamber 17 of the casing 6, seen in the extrusion direction, arrow 5, are defined by support baffles 57–61, located transversely to the extrusion direction, arrow 5, by the end walls 38 and 39 and the side walls 54, 55 of the base plate and of the cover plate 52. The individual flow areas 25–30 have between the individual support baffles 57–61 or the end walls 38 and 39 respectively different lengths 62–67, which, preferably proceeding from the end wall 38, are formed to increase continuously towards the end wall 39. This is necessary because the article 7 entering the entry area 19 is in its longitudinal extension not yet rigid or solid enough, and therefore must be more frequently supported.

The side walls 54 or 55 and the end walls 38 or 39 of the casing 36 form support surface 68 for the cover plate 52, and a sealing member may be located preferably between the support surface 68 and the surface of the cover plate 52 facing the inner space 56 of the casing 36. Thus the support surface 68 is located at a distance 69 from the base plate 53, so that the inner space 56 is restricted in its vertical extension. In this embodiment the two side walls 54 or 55 are located laterally on the base plate 53, which in turn has a width 70 transversely to the extrusion direction, arrow 5, so that the inner space 56 is defined also in the direction transverse to the extrusion direction, arrow 5. The individual support baffles 57 to 51 are inserted or pushed into apertures 71 or 72 in the side walls 54 or 55, a thickness 73 of the individual support baffles 57 to 61 roughly corresponding to a width 74 of the apertures 71 or 72 in the extrusion direction, arrow 5. The apertures 71 or 72, respectively facing one another, in the side walls 54 or 55 have a spacing 75, which is greater than a width 76 of the support baffles 57–61 so that a floating bearing is achieved in the transverse direction to the extrusion direction, arrow 5, and thus an alignment of a profile contour 77 located in the support baffles 57–61 is possible between the individual support baffles 57–61. The individual support baffles 57–61 may be secured in the casing 36 however by any form known from prior art, such for example as adhesion, sealing compounds, retaining strips, retaining catches, slots, seal profiles, grooves etc.

An alignment in height to one another of the individual support baffles 57–61 is effected by the planar contact of the individual support baffles 57–61 on the upper side of the base plate 53 facing the inner space 56 of the casing 36. The individual support baffles 57–61 have in the casing 36 a height 78 proceeding from the base plate 53 towards the cover plate 52, which is less than the distance 69 between the base plate 53 and the cover plate 52. In this way a height differential 79 is formed between upper edges 80 of the individual support baffles 57 to 61 and the support surface 68 for the cover plate 52. This height differential 79 serves to accommodate an insulating member 81, which is inserted in a sealing manner between the upper edges 80 and the support surface 68 as well as the two side walls 54 or 55 in the inner space 56 of the casing 36.

Due to the insertion of the insulating member 81 into the inner space 56 of the casing 36, each of the flow areas 25–30 has the height 78 of the individual support baffles 57–61. The profile contour 77 formed in each of the support baffles 57–61 is arranged in the form of an aperture 82, projecting through the individual support baffles 57–61, the aperture 82 representing the contour shape or outer surface for the article 7 to be cooled, and its outer dimensions being established taking into account the degree of shrinkage during cooling of the article 7 as it passes through the cooling device 16 in the extrusion direction, arrow 5.

The profile contour 77 of the aperture 82 defines an underside 83 facing the base plate 53, and an upper side 84 facing the cover plate 52, of the article to be cooled 7. Depending on the design of the profile contour 77 for the aperture 82, there results between the underside 83 and the upper side 84 of the article to be cooled 7 or the contour form imagined to be established by the profile contour 77, a height 85, which roughly corresponds to the height of the article 7 to be cooled.

Figure 5:
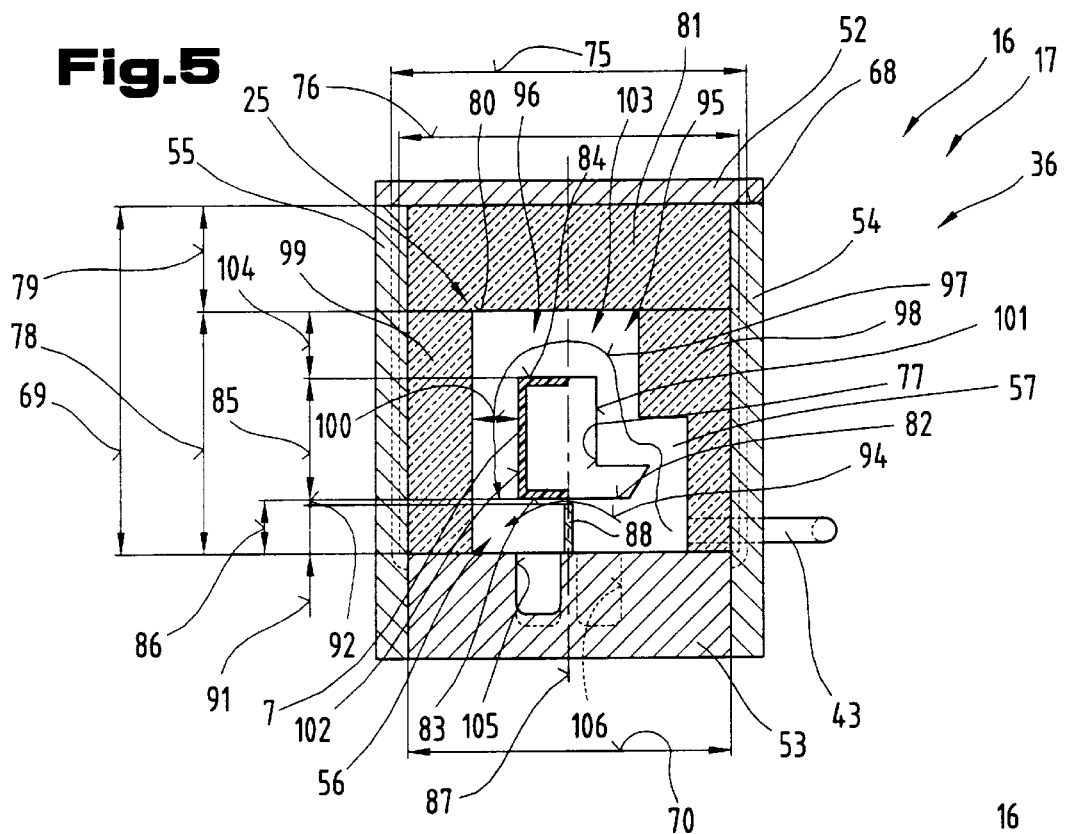
FIG. 5: the cooling and if necessary calibrating device according to FIGS. 2–4 in front elevation in section along the lines V—V in FIG. 3.

It may further be seen in particular from FIG. 5 that the underside 83 of the article 7, or that side of the profile contour 77 facing the base plate 53, is located at a distance 86 proceeding from the upper side of the base plate 53 in the direction of the cover plate 52. Furthermore a plane 87, indicated schematically by broken lines, extends parallel to the side walls 54 or 55, i.e. in the extrusion direction, arrow 5, and is aligned vertically to the surfaces of the cover plate 52 or base plate 53 facing the inner space 56, and is located roughly centrally between the side walls 54 or 55. This central arrangement is effected roughly at half the width 70 between the two side walls 54 and 55. In the area of the base plate 53, each of the individual flow areas 25–30 is subdivided by a longitudinal web 88, which is located in the plane 87 accommodating it, into a chamber 89 or flush chamber 90. Thus the chamber 89 of each individual flow area 25–30 is respectively associated with the inflowing cooling medium 42, and the flush chamber 90 is associated with the cooling medium 42 entering the article 7 after it has been flushed.

The longitudinal web 88 extends in the extrusion direction, arrow 5, in each of the flow areas 25–30 over the entire lengths 62–67 respectively between the end wall 38, the support baffles 57–61 and the end wall 39 associated with the transitional area 20. Proceeding from the surface of the base plate 53 facing the inner space 56 in the direction of the cover plate 52, the longitudinal web 88 has a height 91, which is less by a thickness 92 than the distance 86 between the base plate 53 and the underside of the article 7. The slot formed by the thickness 92 between an upper edge 93 of the longitudinal web 88 and the underside 83 of the article 7 comes to between 0.5 mm and 5 mm, preferably 2 mm, so that a certain flow connection is provided between themselves between the chamber 89 and the flush chamber 90 of the respective flow areas 25–30. This is sufficient correspondingly to cool the underside 83 of the article 7 facing the longitudinal web 88 as schematically indicated by an arrow 94.

Due to the separation of the individual flow areas 25–30, seen in the longitudinal direction, into the alternately arranged chambers 89 or flush chambers 90, there is formed a section 95 between the plane 87 and the side wall 54, and a further section 96 between the plane 87 and the further side wall 55.

In order to achieve in each of the individual flow areas 25–30 a flow of the cooling medium 42 around transversely to the extrusion direction, arrow 5, each of the individual flow areas 25–30 is subdivided into the chamber 89 or flush chamber 90 on either side of the plane 87 by the longitudinal web 88, which in this embodiment ensures an overflow of the cooling medium 42, indicated schematically by arrows 97, over the respective upper sides of the article 7.

As is known to be seen upon viewing the separate FIGS. 2–6 together, the gaseous cooling medium 42 is passed via the feed pipe 48 to the first flow area 25, the feed pipe 48 opening in the chamber 89 and the base area of the flow area 25. In addition, in each of the individual flow areas 25–30 there is associated with the respective side walls 54–55 their own insulating member 98 or 99, which extends in this embodiment parallel to the longitudinal webs 88 and has the same height 78 as the individual support baffles 57–61, so that the inner space 56 and thus also the side walls 54, 55 are insulated from the space surrounding the casing 36. Furthermore it has proved advantageous, in order to obtain a favourable flow of the cooling medium 42 around the article 7, if, between the contour forms of the profile contour 77 of the aperture 82 for the article 7 and the surfaces of the insulating members 98 or 99 facing them, a uniform spacing 100 between 1.0 mm and 20.0 mm, preferably between 5.0 mm and 10.0 mm exists, so that the supercooled gaseous cooling medium 42 is brought close to the outer contour form or outer surface of the article 7 to be cooled and due to the small spacing 100 a better cooling performance can be achieved. In selecting the spacing 100, care should be taken that excessive passage resistance is not opposed to the gaseous cooling medium 42 passing through, as this would otherwise lead to an increased drive power of the circulating device such for example as a fan, turbine or vacuum pump.

Figure 2:
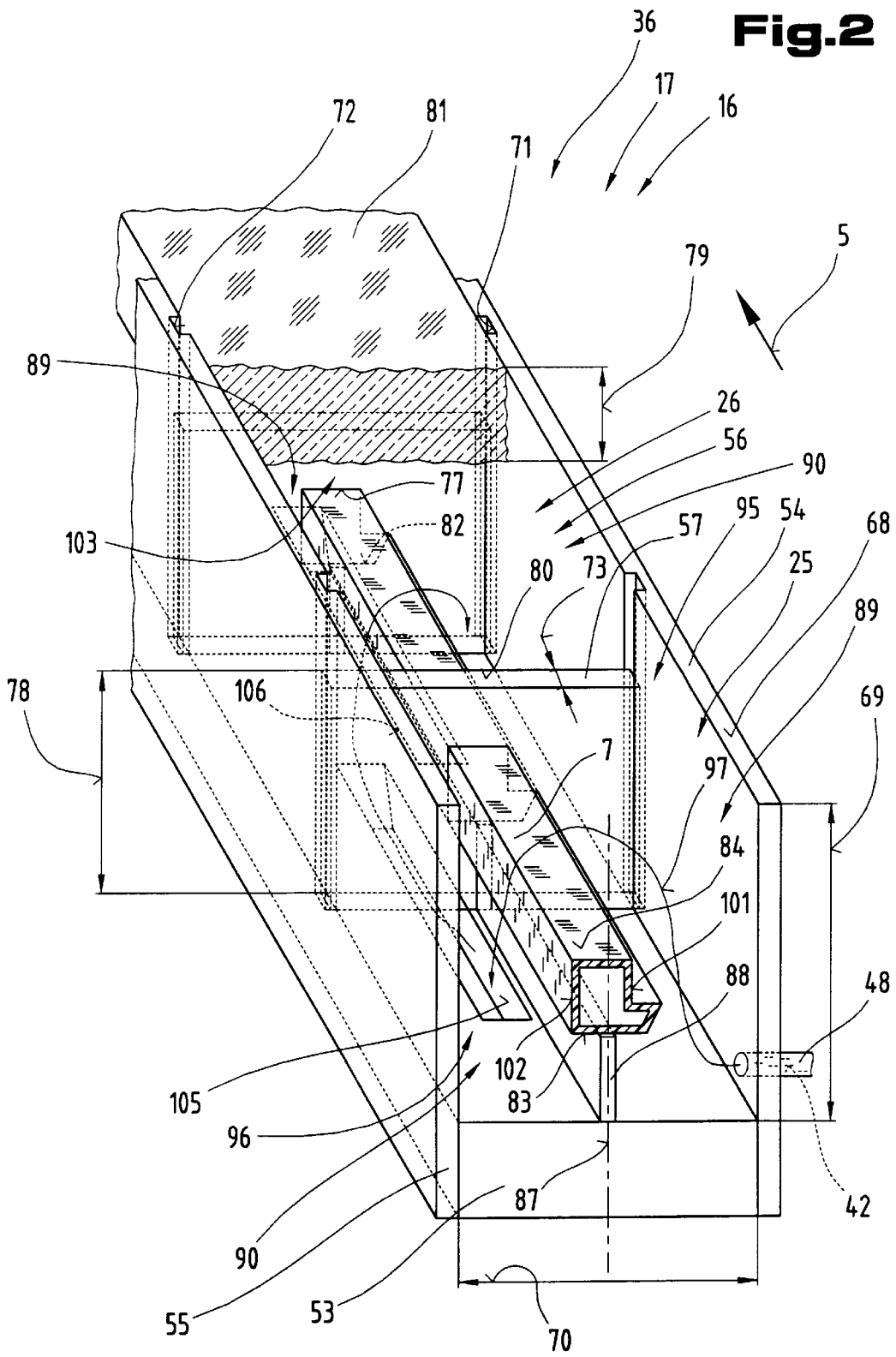
FIG. 2: a schematic sketch of a cooling and if necessary calibrating device of a possible design of the same, if necessary independent in itself, in a pictorial view.
Figure 3:
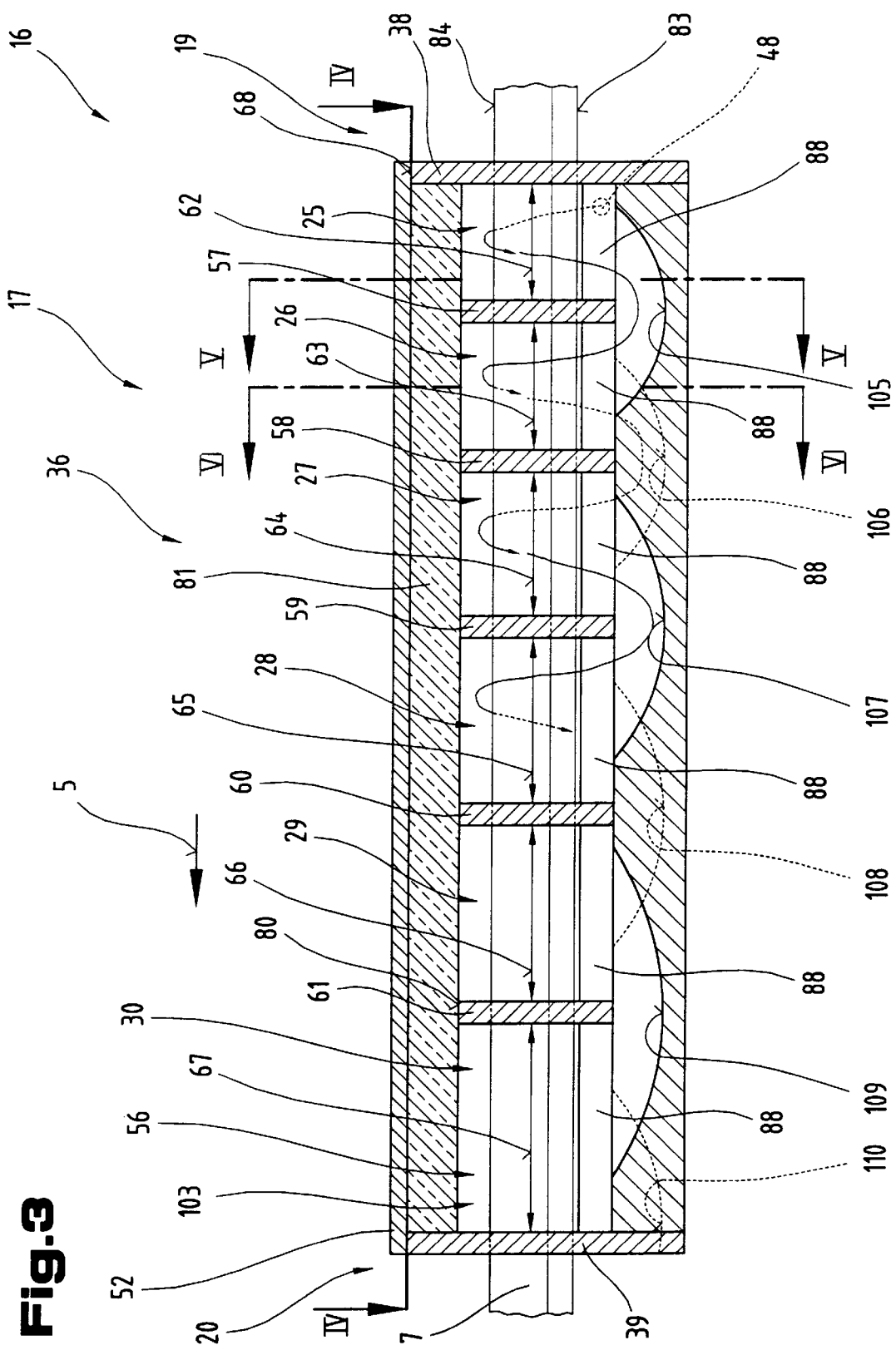
FIG. 3: the cooling and if necessary calibrating device in section in side elevation, along lines III—III in FIG. 4.
Figure 4:
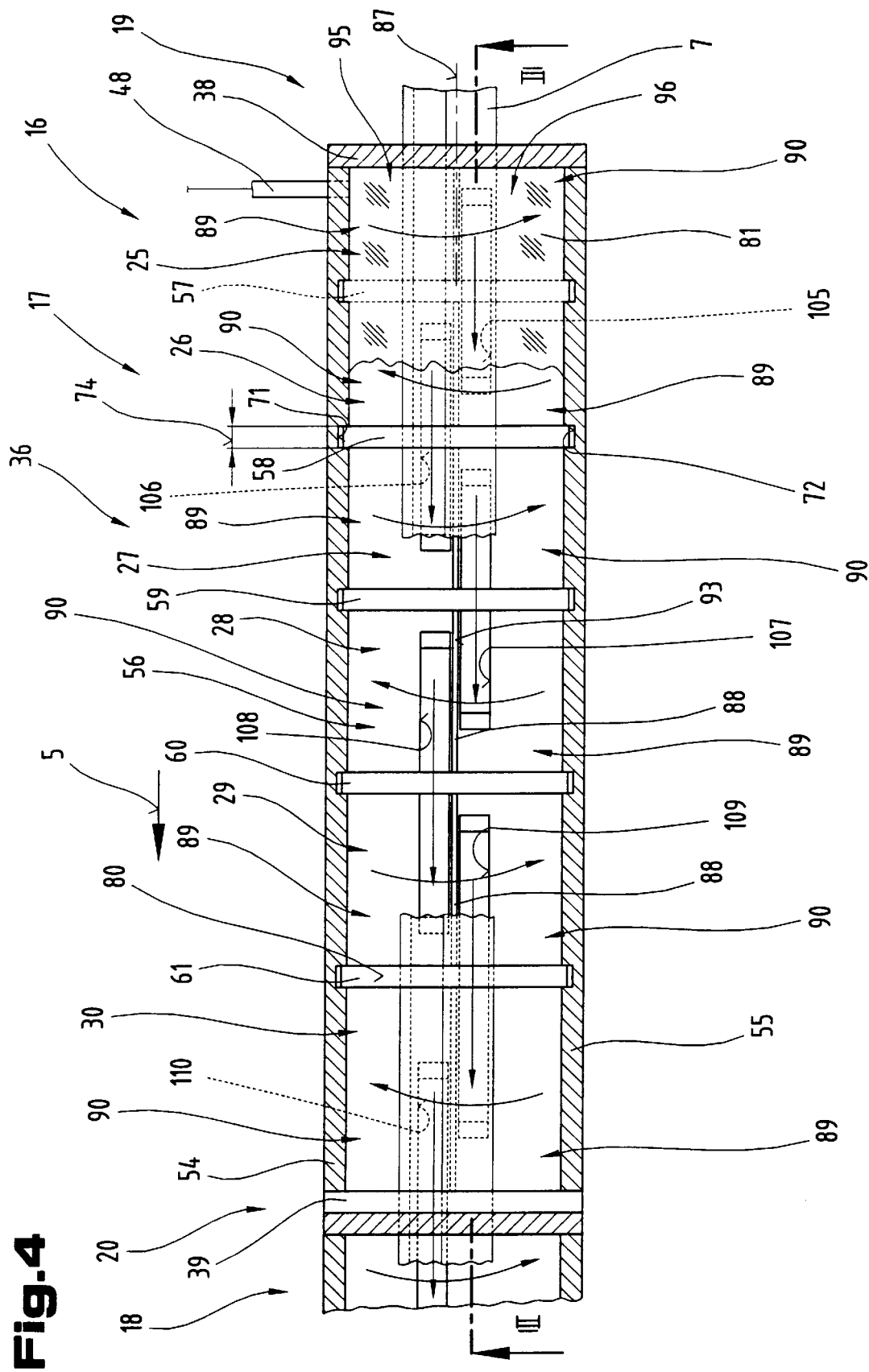
FIG. 4: the cooling and if necessary calibrating device according to FIGS. 2 and 3 in plan view, in section along lines IV—IV in FIG. 3.

It should be pointed out here that in the individual FIGS. 2–4, the insulating members 81, 98 or 99 have only been partly portrayed or, for reasons of improved clarity, have been entirely omitted. The cooling medium 42 which has now flowed into the chamber 89 of the flow area 25 now, rising up a side surface 101 facing the side wall 57, then flows around the upper side 84 and downwards over a side surface 102 of the article 7, which faces the side wall 55 and is now located in the flush chamber 90 of the first flow area 25.

Due to the arrangement of the longitudinal web 88 in the region of the underside 83 of the article 7, and the arrangement of the profile contour 77 of the aperture 82 in the individual support baffles 57–61, there forms between the upper side 84 of the article 7 and the upper edge 80 of the support baffles 57–61 a duct 103 with a height 104. This height 104 of the duct 103 is dependent on the height 85 of the article 7, and it must be ensured that the upper edge 80 of the individual support baffles 57–61 projects over the upper side 84 of the profile contour 77 of the aperture 82 in order to form the duct 103.

A further advantage arises in that, with various profile contours 77, the respective underside 83 of the article 7 is located at the same distance 86 from the base plate 43, so that the longitudinal webs 88 respectively can have the same height 91.

The distance 86 between the base plate 53 and the underside 83 of the article 7, depending on the profile contour 77 selected for the article 7 to be cooled, can be varied in accordance with the necessary thickness 92 of the slot between the upper edge 93 of the longitudinal webs 88 and the underside 83 of the article 7, in order in this area also to obtain an optimum cooling of the underside 83 of the article 7. This variation in the distance 86 is only effected in minimum dimensions, so that the dimensions of the longitudinal webs 88 can remain unaltered as regards height.

By means of the flow of the cooling medium 42 around the article 7 as described above from the chamber 89 into the flush chamber 90, a connection of the first flow area 25 with the flow area 26 directly following it is now necessary, for which purpose a pipe connection in the form of a flow duct 105 is formed in the base plate 53 in the section 96 between the plane 87 and the side wall 55. Thus the flush chamber 90 of the flow area 25 is in a flow connection with the chamber 89 of the flow area 26, the passage of cooling medium occurring preferably in the direction of the longitudinal extension of the article 7 close to the longitudinal web 88, in order to achieve a feed of the cooling medium 42 close to the surface areas of the same.

The overflow of the cooling medium 42 is effected in the flow area 26 in counter-flow transversely to the article to be cooled from the chamber 89 into the flush chamber 90, the flush chamber 90 of flow area 26 being in flow connection with the chamber 89 of the further flow area 27 following it via a further passage duct 106, and each further directly subsequent flow area in turn being in flow connection alternately via passage ducts 107 to 110 in the way previously described.

Figure 6:
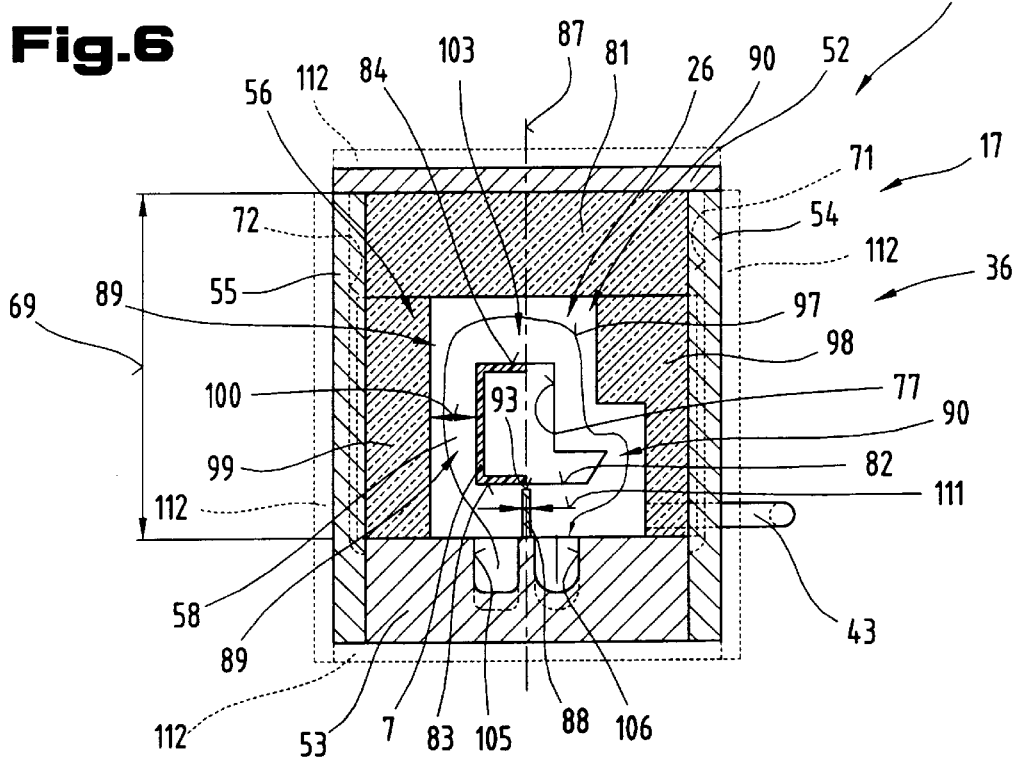
FIG. 6: the cooling and if necessary calibrating device according to FIGS. 2–5 in front elevation in section along the lines VI—VI in FIG. 3.

FIG. 6 shows the flow area 26 with the chamber 89 located between the plane 87 and the side wall 55, and the flush chamber 90 located between the plane 87 and the side wall 54. Thus flow around the article 7 to be cooled is directly opposite to the direction shown in FIG. 5, as shown schematically by the arrow 97 for the cooling medium 42. It has proved favourable if the longitudinal webs have a small thickness 111, and the individual passage ducts 105 to 110 are located close to the longitudinal webs 88. In this way a good flow of the cooling medium 42 is achieved on all sides around the article 7 to be cooled.

The shape of the passage ducts 105–110 can be freely selected both in the extrusion direction, arrow 5 and also transversely to this direction, an arcuate or ellipsoid longitudinal configuration being shown in FIG. 3. The cross-section seen in the extrusion direction, arrow 5 or the longitudinal direction can, as is for example shown in FIG. 5, be roughly rectangular, and it is in addition possible if necessary correspondingly to round the base area of the passage ducts 105–110 with the side walls of the same. Independently of this, the base area of the passage duct 105, as indicated in FIG. 6, can be rounded in an acute form between the side walls of the passage duct 106. The shape or dimensions of the individual passage ducts 105–110 can be freely selected independently, depending on the case of application, and may even vary from flow area to flow area, in order to ensure any special requirements for the passage of coolant. A multiple arrangement next to one another in the extrusion direction, arrow 5 is also possible in each of the individual flow areas.

It is further possible, independently thereof, as shown schematically in FIG. 6 by broken lines, to associate their own insulating members 112 both with the side walls 54 or 55 and with the cover plate 52 and/or the base plate 53 at the surface facing away from the inner space 56, in order to achieve even better insulation of the inner space 56 from the space surrounding the casing 36. A different combination of the individual insulating members 112 in the area of the outer side of the casing 36 and of the insulating members 81, 98, 99 in the inner space 56 of the casing 36 can be freely selected.

Figure 7:
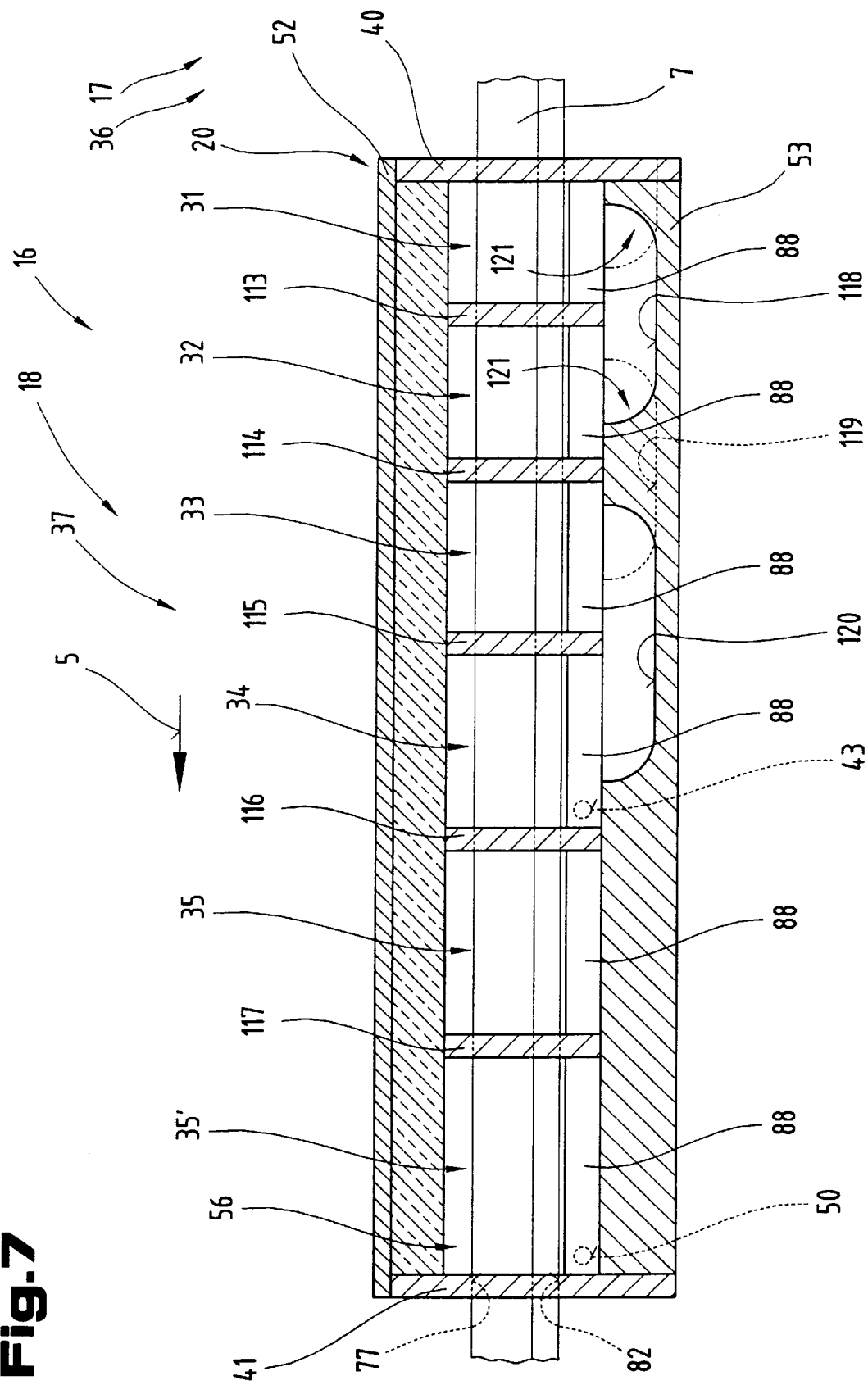
FIG. 7: a further constructive variant of a cooling and if necessary calibrating device likewise independent in itself, according to the invention, in section and in side elevation.

FIG. 7 shows an if necessary independent design according to the invention of the cooling chamber 18 for the cooling device 16, identical reference numbers to those used in FIGS. 1–6 being used for identical parts. Naturally, the cooling chamber 17 can be designed in accordance with the embodiment described here. The casing 37 of the cooling chamber 18 is formed similarly to the casing 36 of the cooling chamber 18 according to the FIGS. 2–6 described above, and preferably follows the cooling chamber 17 with its casing 36 in the extrusion direction, arrow 5.

For reasons of better clarity, illustration of the individual insulating members 98, 99 or 112 has been partially omitted. The casing 37 is formed from the end walls 40, 41 the base plate 53 and the cover plate 52, which thus define the inner space 56. This inner space 56 is subdivided by support baffles 113–117 into the immediately successive flow areas 31–35' in the extrusion direction, arrow 5. The arrangement and design of the longitudinal web 88, of the profile contour 77 of the aperture 82 for the article 7 to be cooled and of the support baffles 113–117 can be effected in accordance with the embodiments already described, a more detailed description being omitted at this point. The flow around the article 7 to be cooled is in each of the immediately successive flow areas 31–35' or 34 transversely and alternatingly thereto.

Located in the transitional area 20 between the casing 36 and the casing 37 of the individual cooling chambers 17 or 18, with respect to the casing 37 there is the end wall 40 with the profile contour 77 by means of the aperture 82. It would naturally also be possible to locate in the individual end walls 38–41 an opening larger than the apertures 82, in order upon change-over of the profile contour 77, merely to insert the support baffles 57–61 or 113–117 located in the inner space 56 with the new profile contour provided for the article 7 to be cooled into the apertures 71, 72 in the side walls 54, 55. Thus if necessary, seal has to be provided between the opening. and the article 7.

The individual flow areas 31–35' are in turn subdivided by the plane 87 extending in the extrusion direction, arrow 5, or the longitudinal direction into the sections 95 or 96 between the plane 87 and the side walls 54 or 45, the chambers 89 or flush chambers 90 being again formed alternatingly from flow area to flow area. The connection between the individual directly successive flow areas 31–35' is effected similarly to the embodiments described above, but alternatingly only in one of the two sections 95 or 96, in this embodiment only the design of the shape of passage ducts 118–120 having been selected differently from the way described in FIGS. 2–6 and the flow connection being effected only in the flow areas 31–34. As previously described in FIG. 1, discharge of the coolant medium 24 is effected from the flow area 34 through the discharge pipe 43, so that a further arrangement of the passage ducts towards the flow areas 35 or 35' is omitted. In order to compensate for corresponding leakage losses or excess air from the evacuated flow areas 31–34 and the flow areas 25–30 of the cooling chamber 17 located preceding them, the flow area 35 and/or 35' is in flow connection via the additional pipe 50 with the coolant supply or the coolant medium 42.

In this embodiment the individual passage ducts 118–120, seen in the extrusion direction, arrow 5, have in their base region a longitudinal configuration extending roughly parallel to the base plate 53, end areas 121 or 122 having, on the ends facing away from one another of the individual passage ducts 118–120, a rounded outflow to the upper side of the base plate 53 facing the inner space 56. In addition, the cross-sectional shapes of the passage ducts 118–120 selected, seen transversely to the extrusion direction, arrow 5, can be formed in the shapes described as in FIG. 5 or 6 and respectively in themselves represent if necessary independent solutions according to the invention.

Figure 8:
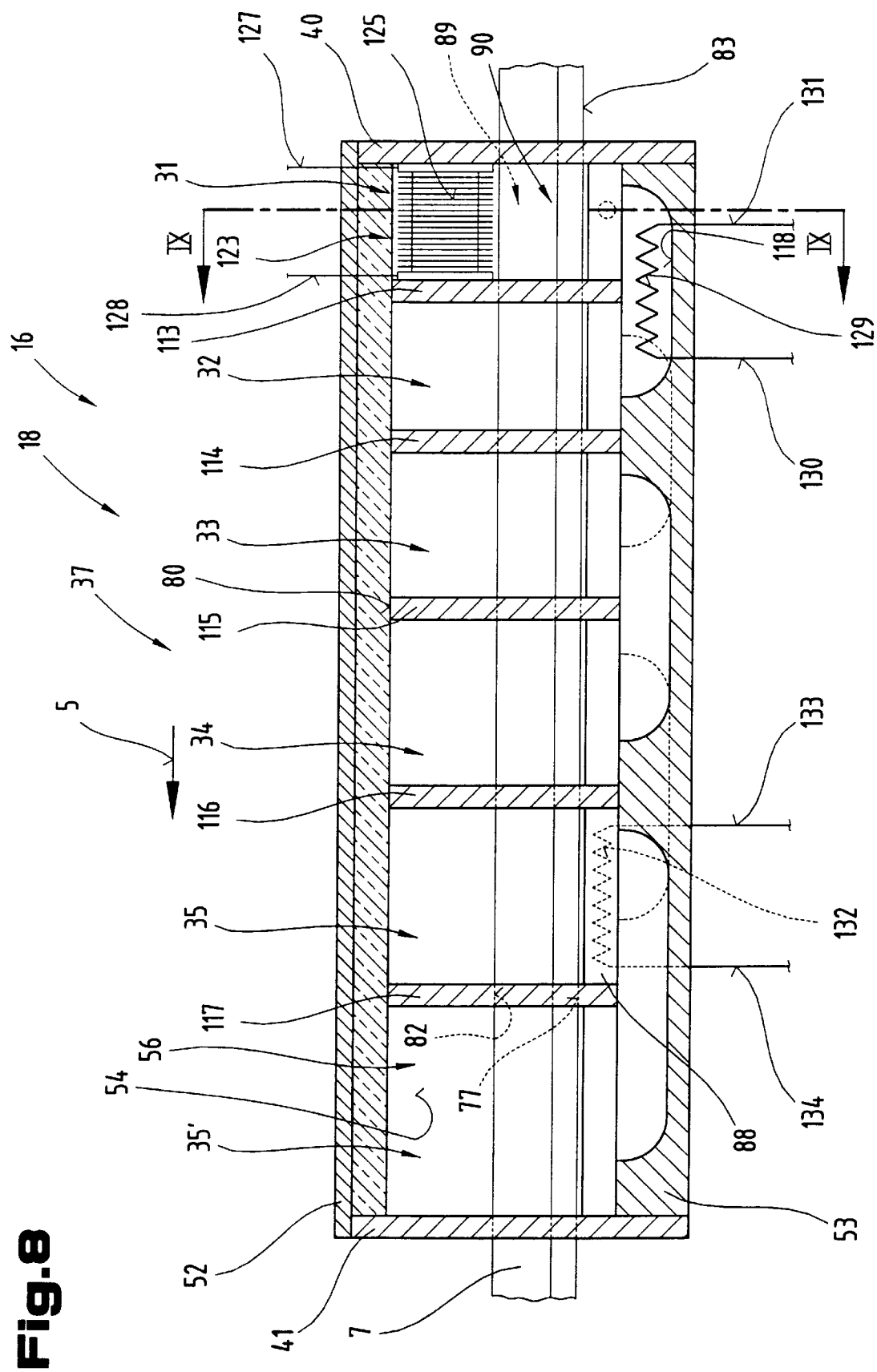
FIG. 8: another embodiment of a cooling and if necessary calibrating device according to the invention with cooling members variously arranged in its interior space, which if necessary can represent in themselves independent solutions according to the invention, in side elevation and in section.
Figure 9:
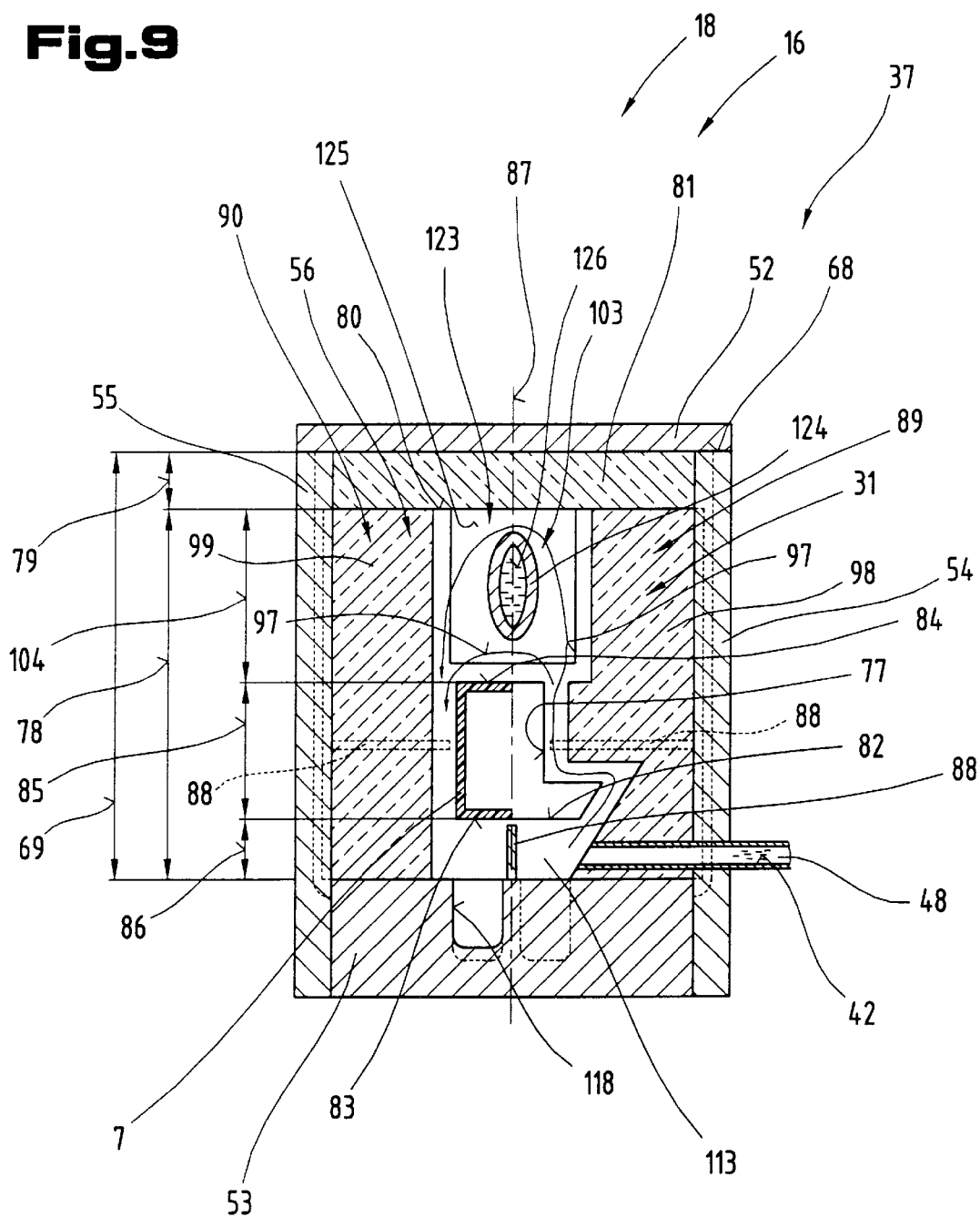
FIG. 9: a partial area of the cooling and if necessary calibrating device according to FIG. 8 in end elevation, in section along lines IX—IX in FIG. 8.

In FIGS. 8 and 9, there are located in addition in the inner space 56 of the cooling chamber 18 of the cooling device 16 cooling members for the flowing coolant medium 42; it should be mentioned that the individual cooling members if necessary represent in themselves independent designs according to the invention, and the arrangement of the same, described only in areas, can extend over a plurality of flow areas 25–35' of the cooling chambers 17 or 18 of the cooling device 16. Naturally, an arrangement only in areas of the same is possible within the casings 36 or 37. As the embodiments described here are similar to the embodiments described previously, identical reference numbers to those in FIGS. 1–7 are used.

Thus in FIG. 8 the casing 37 for the cooling chamber 18 is shown as formed from the end walls 40, 41 of the cover plate 52 and base plate 53 and the side walls 54 or 55, which surround the inner space 56. In the extrusion direction, arrow 5, the inner space 56 is subdivided again by support baffles 113–117 into the flow areas 31–35'. Again located in the individual support baffles 113–117 are the apertures 82 for the profile contour 77 of the article 7. In this embodiment again there are located between the base plate 53 and the underside 83 of the article 7 in the plane 87 described before the longitudinal webs 88, which separate the flow areas 31–35' into the chambers 89 or flush chambers 90 alternatingly offset to one another.

Proceeding from the upper side of the base plate 53 facing the inner space 56, the support baffles 113–117 have, in the direction of the cover plate 52, the height 78. In the distance 86, proceeding from the base plate 53, is located the underside 83 of the profile contour 77, and the article 7 has in the vertical direction between the underside 83 and its upper side 84 the height 85.

The upper edge 80 of the individual support baffles 113–117 projects over the upper side 84 of the article 7 by the height 104. The surfaces facing one another of the base plate 53 and of the cover plate 52 are located at the vertical distance 69 from one another, the height differential 79 resulting between the height 78 and the distance 69 being closed by the insulating member 81, or the latter being located inside said height differential.

Proceeding from the side walls 54 and 55 in the direction of the plane 87, in the individual successive flow areas 31–35', extending in the extrusion direction, arrow 5, are the insulating members 98 and 99, which insulate the inner space 56 from the air space surrounding the casing 37 and simultaneously thus also establish the flow cross-sections between the profile contour 77 of the aperture 82 and side surfaces of the insulating members 98 or 99 for the coolant medium 42 flowing through.

In this embodiment there is located in the duct 103 between the upper side 84 of the article 7 and the upper edge 80, which in this embodiment forms the support surface for the insulating member 8 1, an additional cooling member 123 which, in the form of a cooling tube 124 is provided thereon with cooling fins 125 serving to enlarge the cooling surface. There flows through the cooling tube 124 a schematically indicated coolant 126, which is in a flow connection via a schematically indicated feed pipe 127 or discharge pipe 128 with cooling and conveying units not described in further detail or heat exchangers within the calibrating table 4. By means of the coolant 126, the coolant medium 42 flowing via the schematically indicated feed pipe 48 into the chamber 89, and which is schematically indicated by the arrows 97, is passed during the transition from the chamber 89 into the flush chamber 90 between the individual cooling fins 125 and is there additionally cooled. Due to this additional cooling an even better cooling effect for the article 7 to be cooled is achieved, and due to the physical properties according to which for example warmer air is lighter and rises and cooler air again falls, the flow effect within the cooling chamber 18 for the vacuum built up therein is additionally reinforced. During flow around or along by the coolant medium 42 in the area between the plane 87 and the side wall 54 in the area of the article 7, said medium is heated, and due to the heating rises in the direction of the cover plate 52, this upward movement being additionally reinforced for the vacuum constantly increasing from flow area to flow area, and a further cooling of the already heated cooling medium 42 is effected in the duct 103, said coolant medium, after its cooling flow down along the surface areas between the plane 87 and the side wall 55 of the article 7.

The connection and arrangement of the individual flow areas 31–35' between themselves and the flow ducts 105–110; 118–120 can be effected in accordance with the constructions described in FIGS. 2–7, any optional combination of course being possible.

By means of the additional arrangement of the cooling member 123 in the duct 103 between the upper side 84 of the article 7 and the upper edge 80 of the support baffles 113–117, an even better cooling of the article 7 is achieved over the entire length of the cooling chamber 18. With a corresponding arrangement and layout of the cooling member 123 and of a longitudinal extension of the same between the end walls 40 or 41, for example the additional cooling device 45 for the coolant medium 42 described in FIG. 1 can for example be omitted, and the corresponding build-up of vacuum within the cooling chamber 18, i.e. in its inner space 56, need only be assured by the vacuum pump 44 or the regulating device 49.

A further possible arrangement of an additional cooling member 129 is schematically indicated in FIG. 8 in the flow duct 118 connecting the two flow areas 31 and 32. Due to the forced passage of the coolant medium 42 through the individual flow ducts between the individual flow areas 31–35', in the arrangement, here likewise shown schematically, of the additional cooling member 129, an additional heat removal from the coolant medium 42 is achieved by the coolant 126 from the inner space 56 of the cooling chamber 18. The cooling member 129 communicates here via a schematically indicated feed and discharge pipe 130 or 131 with cooling and conveying units or heating chambers not shown in more detail, within the calibrating table 4. In the embodiment shown here, for the cooling member 129 the flow direction for the coolant 126 is selected to be opposite to the extrusion direction, arrow 5, as this can be advantageous in specific cases of application for the cooling progression of the article 7 to be cooled. Preferably however, as shown at the cooling member 123, the same flow direction is selected for the coolant 126 as the extrusion direction, arrow 5. As described above, however this depends on the requirements made of the cooling configuration and is freely selectable in accordance therewith.

There is shown in the flow area 35 of the cooling chamber 18 a further possible arrangement of an additional cooling member 132, which is located for example within the longitudinal web 88, or the longitudinal web 88 itself is formed as a cooling member 132. For this purpose it is for example possible to provide within the longitudinal web 88 passage openings which communicate via a schematically indicated feed and discharge pipe 133 or 134 in turn with cooling or conveying units or heat exchangers not shown in more detail. In the case for example of an arrangement flowing in the longitudinal direction of the cooling chamber 18 of the longitudinal web 88 between the end walls 40 or 41, an additional cooling can be achieved also in the area of the longitudinal web 88 for the coolant medium 42 flowing through. It should be mentioned at this point that the arrangement or design of the individual cooling members 123, 129 or 132 described here can be effected according to known prior art and can if necessary represent independent designs or solutions according to the invention on their own or in combination with one another. Furthermore it is advantageous if the coolant 126 has a temperature of below 0° C., preferably between −15° C. and −30° C. or −40° C.

Figure 10:
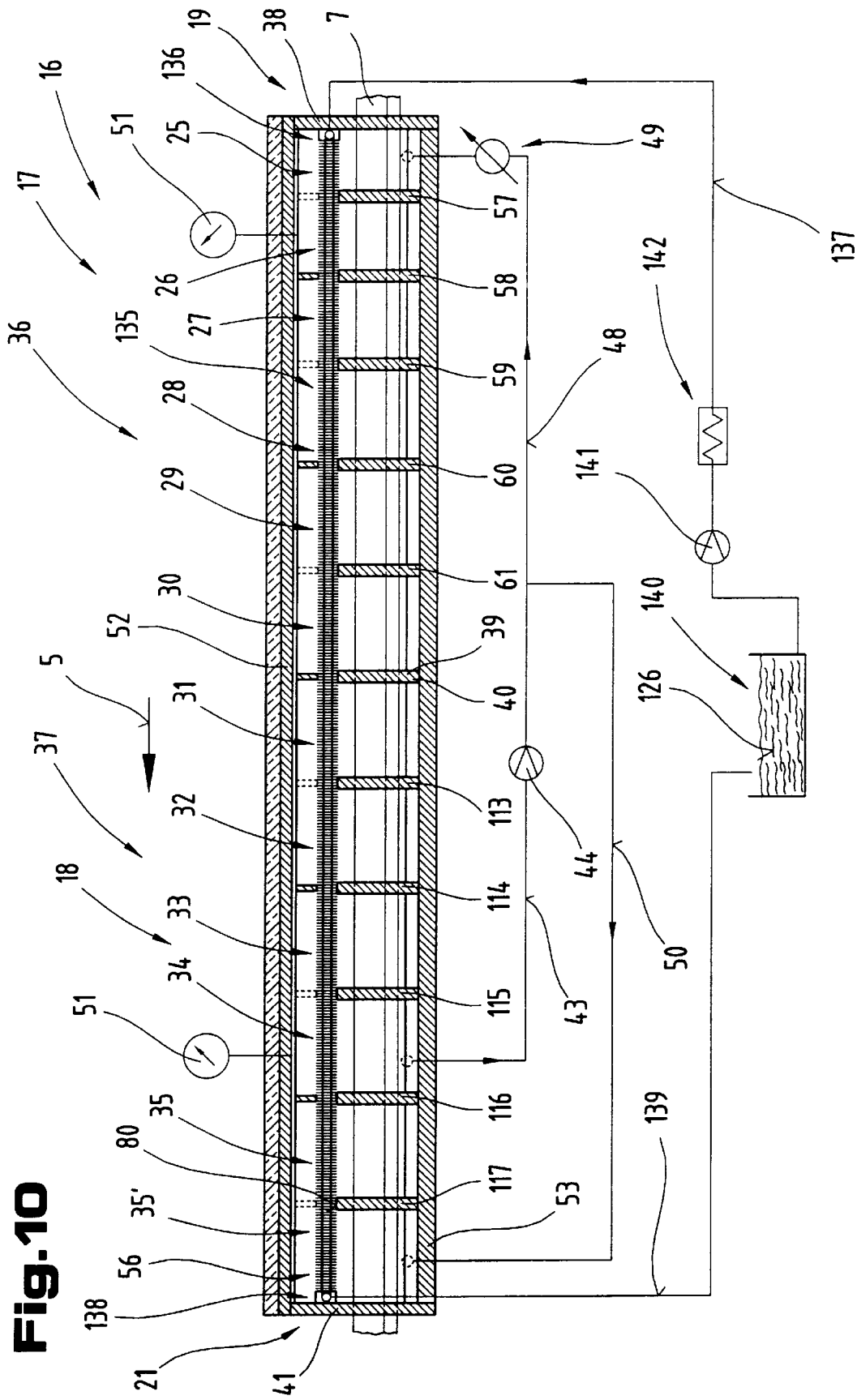
FIG. 10: a schematic sketch of a further and if necessary in itself independent solution according to the invention of the cooling and if necessary calibrating device in side elevation in section and in simplified schematic view.
Figure 11:
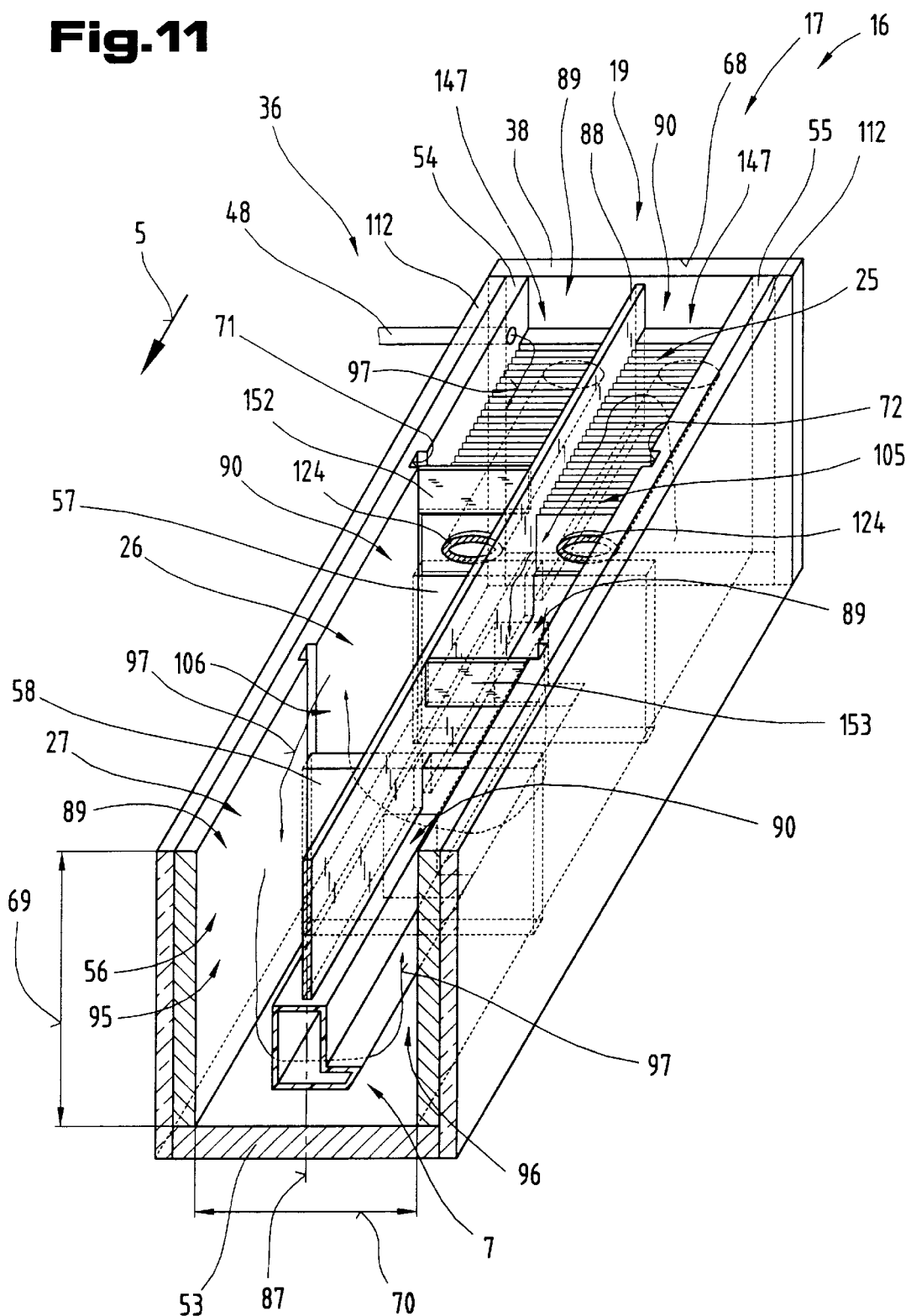
FIG. 11: the cooling and if necessary calibrating device according to FIG. 10 in a simplified pictorial view.
Figure 12:
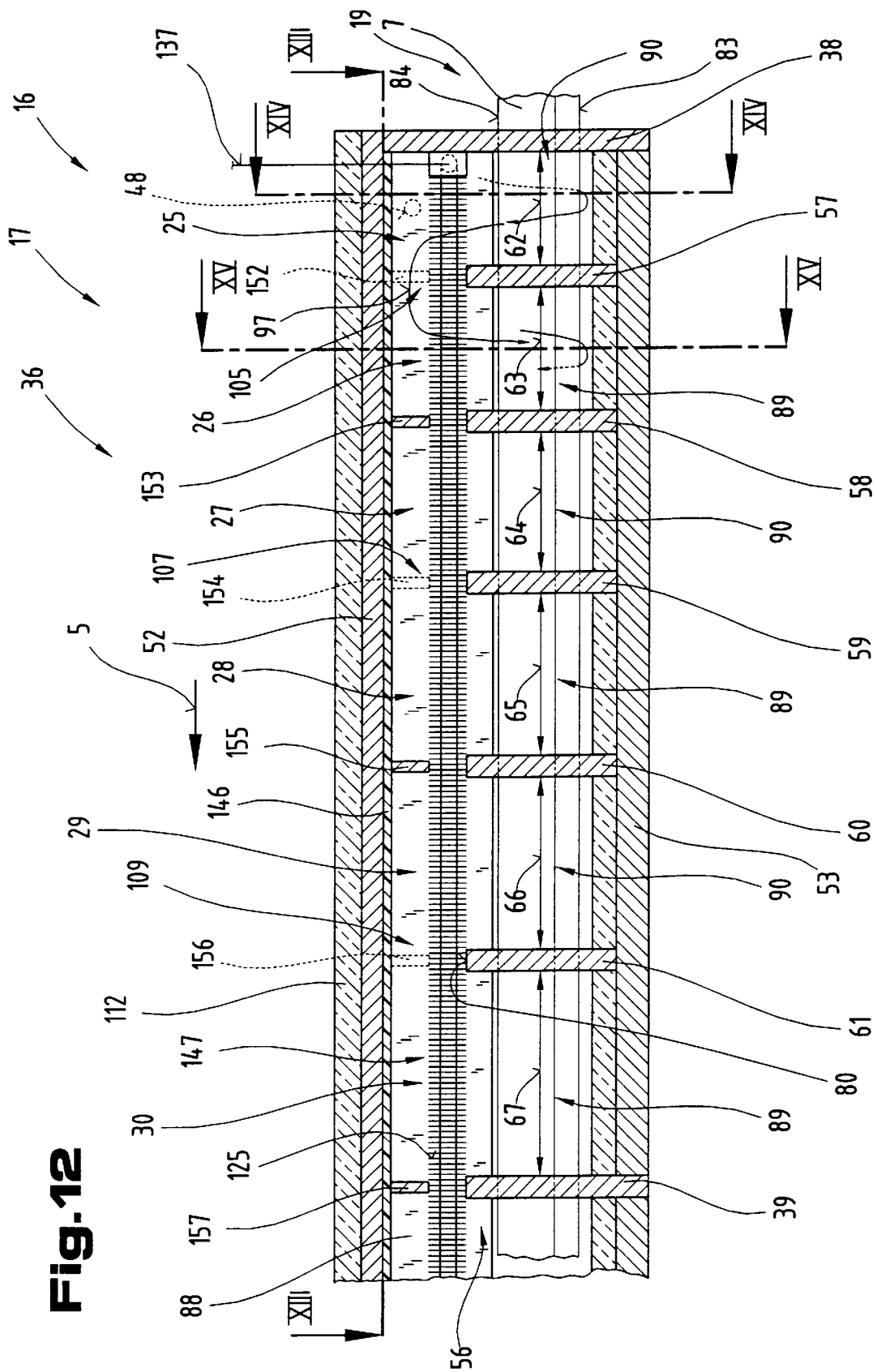
FIG. 12: a partial area of the cooling and if necessary calibrating device according to FIGS. 10 and 11 in side elevation and in section.
Figure 13:
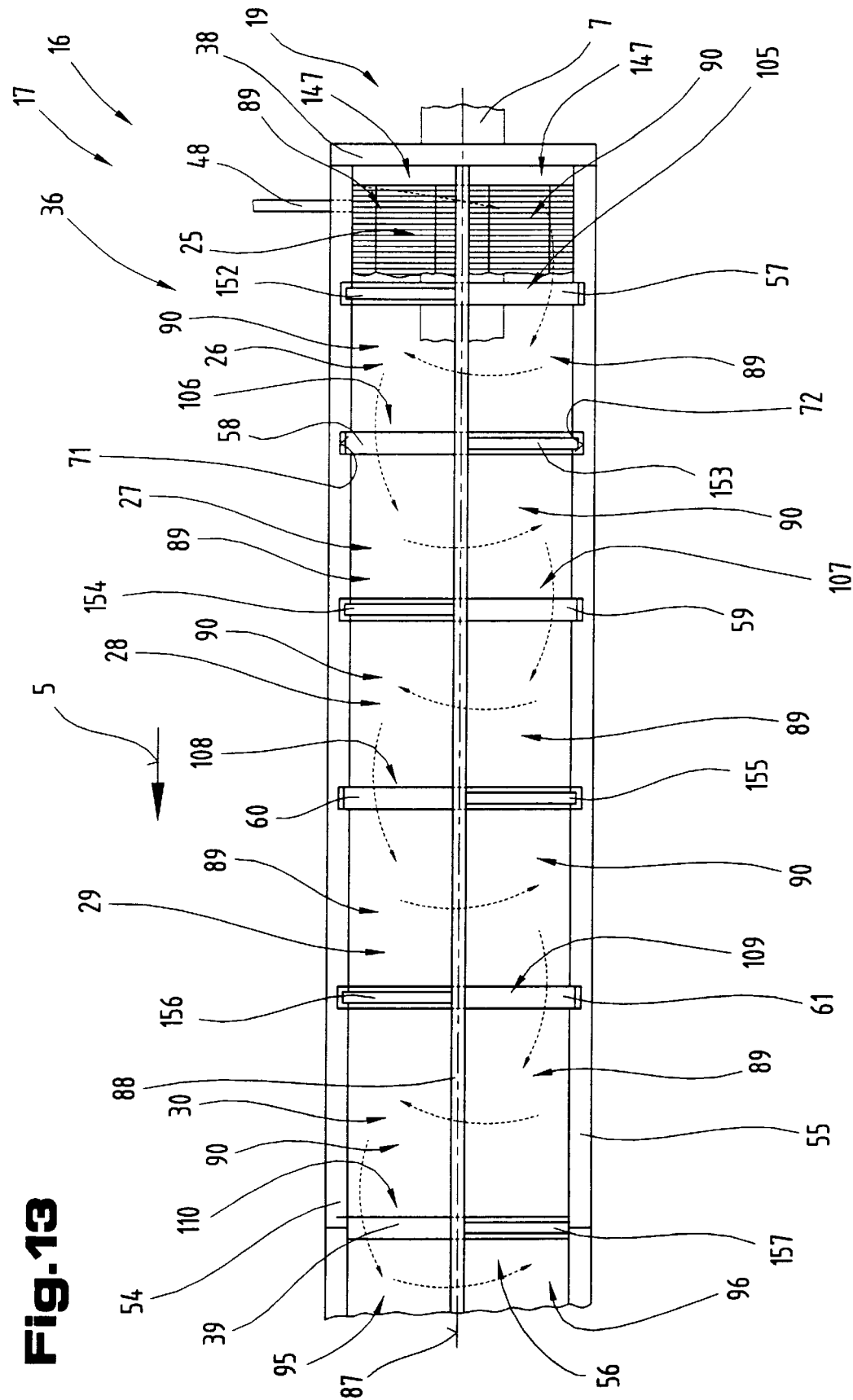
FIG. 13: the cooling and if necessary calibrating device according to FIGS. 10–12 in plan view in section along lines XIII—XIII in FIG. 12.

FIGS. 10–15 show a further possible design of a cooling device 16, identical reference numbers to those used in FIGS. 1–9 being used for identical parts, and this design likewise being capable in itself of representing an independent solution according to the invention. FIG. 10 shows the cooling device 16 with its cooling chambers 17 or 18 in a schematically simplified view in side view in section, in order in this embodiment to be able to describe in itself the respective arrangement relating to the flow of the coolant medium 42 and of its own coolant 126 in their respective own circuits.

The cooling chambers 17 or 18 are formed from the cover plate 52, the base plate 53, the laterally arranged side walls 54 or 55 and the end walls 38–41 which thus surround the inner space 56 of the cooling device 16. Thus the end walls 39 or 40 are integrally formed and in the manner of a support baffle, in order to enable also a spacial separation of the two casings 36 or 37 in their longitudinal extension, if no continuous cooling device is provided. In the inner space 56 the support baffles 57–61 or 113–117 are provided, which subdivide the inner space 56 into the flow areas 25–35', seen in the extrusion direction, arrow 5. The build-up of vacuum within the cooling device 16 is effected proceeding from the entry area 19 of the article 7, i.e. the flow area 25, towards the flow area 34. In this case the vacuum in the flow area 25 is still very slight, for example between 0 bar and 0.1 bar and increases per flow area by 0.02 bar −0.1 bar and in the outlet area of the coolant medium 42, i.e. the flow area 34, comes to between −0.1 bar and −0.5 bar, preferably −0.2 bar. Due to this slight vacuum in the entry area 19 of the cooling chamber 17 the still highly viscous article 7 is not exposed to too high a vacuum, so that an alteration in shape due to the vacuum cannot occur. Due to the further cooling of the article 7 passing through the cooling device 16, the vacuum can correspondingly increase from flow area to flow area, or the absolute pressure can reduce, as consolidation and thus rigidification of the profile occur with the progressive cooling.

The coolant medium 42 flows through the cooling device 16 preferably in the extrusion direction, arrow 5, and is suctioned by means of the schematically indicated vacuum pump 44 through the discharge pipe 43 out of the flow area 34 of the cooling device 16. In order to be able correspondingly to set the vacuum in the inner space 56 of the cooling device 16, there is located in the feed pipe 48, which opens in the entry area 19, i.e. in the flow area 25 of the cooling chamber 17, the regulating device 49, for example in the shape of a throttle valve. This regulating device 49 enables the passage of the coolant medium 42 to be reduced correspondingly thus enabling the build-up of vacuum in the inner space 56.

In this embodiment the coolant medium is directly cooled in the inner space 56 by means of its own additional cooling member 135 upon each flow over from flow area to flow area, so that a more intense cooling of the article 7 passing through the cooling device 16 is possible. The cooling member 135 thus lies on the upper edges 80 of the support baffles, and is in addition located at a spacing from the cover plate 52. The design of the cooling member 135 can be in accordance with the cooling member 123 described in FIGS. 8 and 9.

As can further be seen from this illustration, the additional cooling member 135, proceeding from the end wall 38 of the entry area 19, extends as far as the end wall 41 of the outlet area 21. In this case an end face 136 facing the end wall 38 is in a flow connection with a feed pipe 137 and an end face 138 facing the end wall 41 with a discharge pipe 139. The coolant 126 flowing through the cooling member 135 can for example be stored after flowing down through the discharge pipe 139 in its own collecting container 140, and can be passed therefrom by means of a conveyor pump 141 to a subsequent cooling device 142, in which the coolant 126 is cooled for example to a temperature of below 0° C., preferably between −15° C. and −30° C. or 40° C., and is passed via the feed pipe 137 to the cooling member 135. The flow direction of the coolant 126 shown and described here, through the additional cooling member 135 is in the extrusion direction, arrow 5; however it should be mentioned here, that it can also be appropriate for certain requirements constrained by the process or the profile, to select the flow direction of the coolant 126 opposite to the extrusion direction, arrow 5. Thus for example only the connections at the cooling member 135 for the feed and discharge pipe 137 or 139 need only be correspondingly changed over.

The flow of coolant medium 42 by means of a vacuum pump 44 is here likewise in the extrusion direction, arrow 5; in this embodiment it is also possible to compensate for corresponding leakage losses or an excess of coolant medium 42 in connection with the vacuum pump 44 in a corresponding manner, if the feed pipe 48 is connected or joined to the additional pipe 50 which opens into the flow area 35' of the cooling chamber 18 and coolant medium 42 is likewise fed to it. Thus in this embodiment the two flow areas 35 or 35' adjacent to the outlet area 21 have no pressure relative to the flow areas 25 to 34 preceeding them, or a vacuum built up therein. In order however to be able to monitor or control the build-up of vacuum in the preceeding flow areas 25–34, there can be associated either with each flow area or only individual ones thereon display instruments 55, which indicate the constant build-up of a vacuum from flow area to flow area.

It should be mentioned at this point that in all the embodiments described the arrangement of the individual support baffles 57–61 or 113–117 and the flow areas 25–35' located between these and the end walls 38–41 have only been shown by way of example, and both the number of the flow areas and of the support baffles and their spacings to one another can be freely selected depending on the case of application for the article 7 to be cooled according to requirements. The same likewise applies to the selected length of the cooling device 16 between the inlet area 19 and the outlet area 21. Likewise, the feed of coolant medium 42 into the last flow areas of the cooling device 16 is not absolutely necessary, and the build-up of vacuum can extend over the entire length of the cooling device 16.

In FIGS. 11–15, only the cooling chamber 17 of the cooling device 16 is shown in more detail, naturally the embodiments shown here being also valid for the cooling chamber 18 of the cooling device 16.

The cooling chamber 17 for the article 7 to be cooled comprises the casing 36, which is formed from the cover plate 52, the base plate 53, the side walls 54 or 55 and the end walls 38 or 39, which define or surround the inner space 56. The inner space 56 proceeding from the end wall 38 in the extrusion direction, arrow 5, towards the end wall 39 or 41, is subdivided by the support baffles 57–61 into the successive flow areas 25–30.

In this embodiment a longitudinal web 88 is again located in the plane 87 accommodating it between the two side walls 54 or 55 and extends from the surface of the cover plate 52 facing the inner space 56 in the direction of the upper side 84 of the article 7 to be cooled and is located preferably continuously over the entire longitudinal extension of the cooling device 16. In this embodiment the two side walls 54 or 55 are located above the base plate 53 and are spaced from one another by the width 70 transversely to the extrusion direction, arrow 5. The two side walls 54 and 55 form on the side facing away from the base plate 53 the support surface 68 for the cover plate 52. In this case the support surface 68 is located at the distance 69 from the base plate 53, so that the vertical extension of the inner space 56 is restricted.

The individual support baffles 57–51 have the height 78 from the base plate 53 in the direction of the cover plate 52, which is smaller than the distance 69 by the height differential 79. The individual support baffles 57–61 are again inserted in apertures 71 or 72 of the side walls 54 or 55. The individual support baffles can be secured in the casing 31 however by any form known from prior art such for example as by adhesion, sealing compounds, retaining strips, retaining catches, slots, seal profiles, grooves etc. In the individual support baffles, again there is located the aperture 82 with the profiles contour 77 for the article 7 to be cooled, the aperture 82 representing the contour shape or outer surface for the article 7 to be cooled, and its external dimensions being established taking into account the degree of shrinkage during cooling of the article 7 as it passes through the cooling device 16 in the extrusion direction, arrow 5.

The underside 83 of the article 7 is in this case located from the surface of the base plate 53 by the distance 86. Furthermore the article 7 has between the under side 83 and the upper side 84 the height 85, which roughly corresponds to the height of the profile contour 77. Between the upper side 84 of the article 7 to be cooled or the upper side of the aperture 82 and a lower side 143 of the longitudinal web 88 there is formed the slot 92, the thickness 92 of the slot coming to between 0.5 mm and 5 mm, preferably 2 mm. Proceeding from the upper edge 80 of the individual support baffles 57–61, the longitudinal web 88 projects in the direction of the base plate 53 by a projection 144 over the upper edge 80. Thus the longitudinal web 88 has in the vertical direction between the surfaces of the cover plate 52 or base plate 53 facing one another, the height 91 which is made up of the height differential 79 plus the projection 144 and minus a possible thickness 145 of a seal member 146.

By means of the arrangement of the longitudinal web 88 above the article 7 to be cooled, i.e. between the cover plate 52 and the upper side 84 of the article 7 to be cooled, the individual flow areas 25–30 are again subdivided into the sections 95 or 96 on either side of the plane 87 in the longitudinal direction of the cooling device 16. Due to this subdivision by the longitudinal web 88 into the secitons 95 and 96, each of the individual flow areas 25–30 is subdivided into the alternating chambers 89 or flush chambers 90, which are in a flow connection with one another via the duct 103 between the underside 83 of the article 7 to be cooled and the base plate 53.

In addition there may be located between the side walls 54 or 55 and the base plate 53 and the article 7 to be cooled again one or even more insulating members 98 or 99; it is advantageous in order to achieve a favourable flow of the coolant medium 42 around the article 7, if between the contour form of the profile contour 77 of the aperture 82 for the article 7 and the surfaces facing it of the insulating members 98 or 99, there is a uniform spacing 100 between 1.0 mm and 20.0 mm, preferably between 5.0 mm and 10.0 mm, so that the super-cooled gaseous coolant medium 42 is passed close to the outer contour form or outer surface of the article 7 to be cooled, and the build-up of vacuum is better and easier to achieve due to the small spacing 100.

Figure 14:
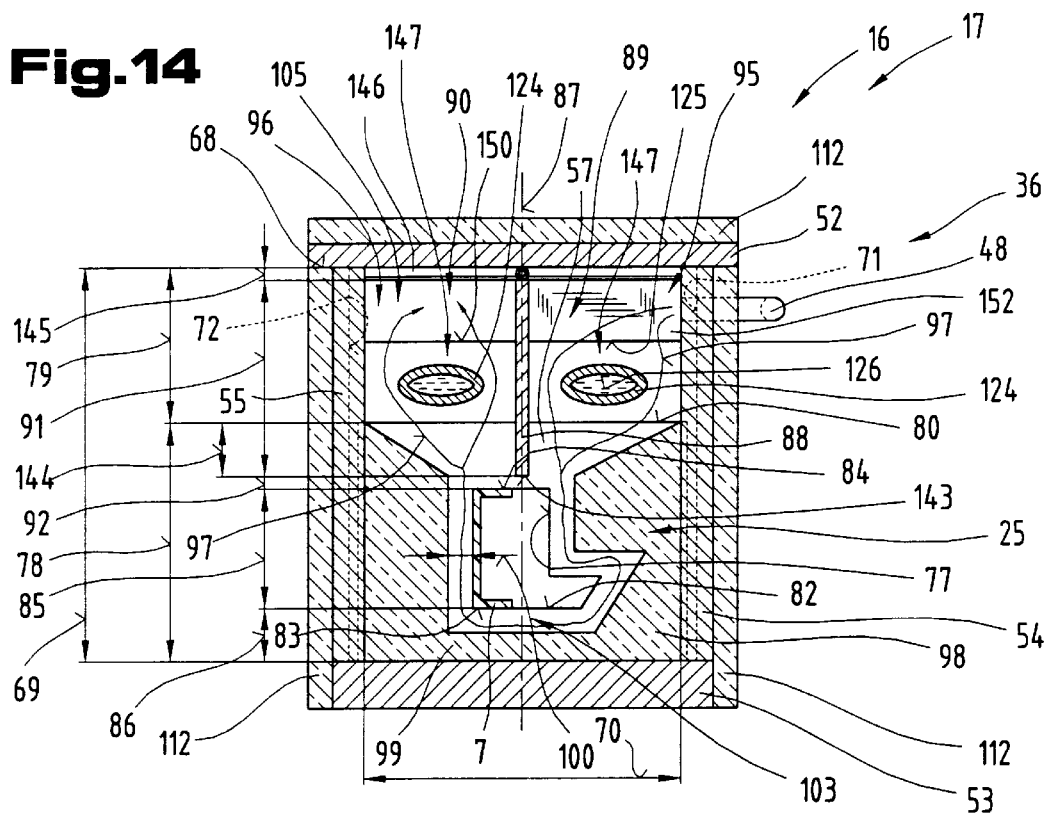
FIG. 14: the cooling and if necessary calibrating device according to FIGS. 10–13 in end elevation in section along lines XIV—XIV in FIG. 12.
Figure 15:
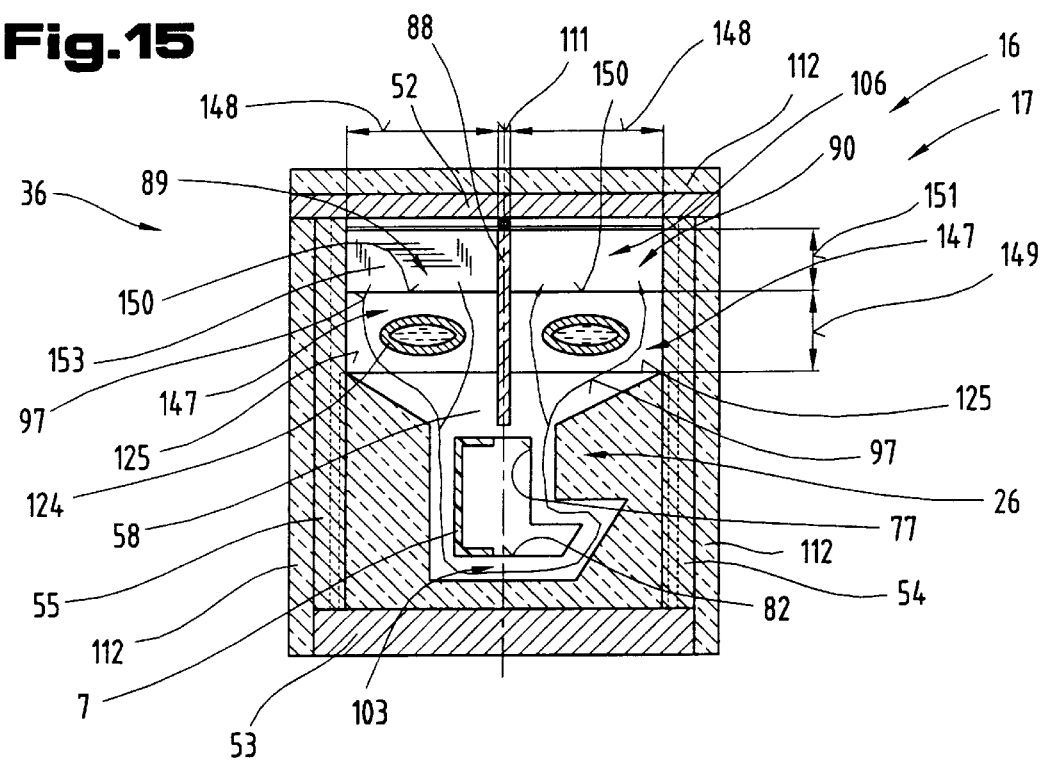
FIG. 15: the cooling and if necessary calibrating device according to FIGS. 10–14 in end elevation, in section along lines XV–XV in FIG. 12.

As is in particular to be seen from the illustrations in FIGS. 14 and 15, flow around the article 7 is effected from the chamber 89 into the flush chamber 90 between the underside 83 of the article 7 and the base plate 53 or the insulating members 98, 99 in the duct 103. The coolant medium 42 is introduced via the feed pipe 48 into the first flow area 25 of the cooling chamber 17 and is schematically indicated by the arrows 97. In order to obtain a more intensive cooling of the inflowing coolant medium 42, there is located in the region of the upper edge 80 of the support baffles 57–61 a cooling member 135 or a plurality of cooling members 147 next to one another, extending between the end walls 38 or 41, said cooling member or members in this embodiment being provided as cooling cubes 124 with cooling fins 125 respectively located thereon and serving to enlarge the cooling surface. Due to the separate arrangement of the two cooling tubes 124 it is possible to locate the two cooling members 147 spaced apart from one another, and preferably to connect them together in the end areas facing the end walls 38–41, in order to ensure a flow connection. It is however also possible to provide the cooling members 147 respectively with their own feed and discharge pipes, in order to achieve a separate coolant flow.

The longitudinal web 88 has the thickness 111 transversely to the direction of conveyance, i.e. vertical to the side walls 54 or 55, and is inserted between the two cooling members 147 or their cooling fins 125. In this case the cooling fins 125 respectively have a width 148 transversely to the direction of conveyance, the two widths 148 plus the thickness 111 of the longitudinal web 88 roughly corresponding to the width 70 between the two side walls 54 or 55. In the vertical direction to their width extension, the cooling fins 125 have a height 149 which is less than the height differential 79. Thus there is formed between one upper side 150 of the cooling members 147 and the surface of the cover plate 52 facing the inner space 56 a spacial height 151.

This spatial height 151 serves to enable the coolant medium 42 located between the upper side 150 and the cover plate 52 to be distributed over the lengths 62–67 of the flow areas 25–30, in a uniform manner in the longitudinal extension of the cooling members 147. In this case the feed pipe 48 opens in the first flow area 25 in the area between the upper side 150 of the cooling members 147 and the cover plate 52 and flows between the cooling fins 125 through the chamber 89 along the side surfaces of the article 7, which are facing the side wall 54, and then passes through the duct 103, flushing around the underside 83 of the article 7, at the side surfaces of the article-7 which are facing the side wall 55, into the flush chamber 90, and then at this point flows forward to the further cooling member 147. The cooling medium 42 flows between the individual cooling fins 125 into the free space between the upper side 150 of the cooling member 147 and the cover plate 52, and is thus again cooled.

In order again to ensure the alternate overflow of the cooling medium 42 from one flow area to the immediately succeeding flow area there is alternatively located on either side of the plane 87 in the area of the support baffles 57–61 between the upper side 150 of the cooling members 147 and the cover plate 52, a respective separating wall 152–157 extending over the spatial height 151, if necessary minus the thickness of the seal member 146. Transversely to the extrusion direction, arrow 5, the individual separating walls 152–157 have roughly the width 148 of the cooling fins 125, so that a sealed closure is achieved on the one hand between the longitudinal web 88 and the side wall 54 and on the other hand between the longitudinal web 88 and the side wall 55 in each of the individual sections 94 or 96. The separating walls 152–157 are preferably connected to the longitudinal web 88 and form an integral component for assembly of the cooling device 16.

Thus in the first flow area 25 of cooling chamber 17, the chamber 89 in section 95 is bordered by the side wall 54, the cover plate 52, the base plate 53, the separating wall 152, a portion of the cooling fins 125, the longitudinal web 88 and the support baffle 57, so that the cooling medium 42, flushing around the article 7, overflows through the duct 103 into the flush chamber 90 transversely to the article 7 or to the extrusion direction, arrow 5. This alternating overflow from flow area to flow area is shown schematically by broken arrows in FIG. 13. A flow connection between the flush chamber 90 of the flow area 25 and the immediately subsequent chamber 89 of the flow area 26 is effected in section 96 between the plane 87 and the side wall 55 in the free space between the upper side 150 of the cooling member 147 and the cover plate 52. This free space thus again forms the flow duct 105 for the cooling medium 42 between the flow area 25 and 26 in section 96.

Flow area 26 is shown in FIG. 15 in cross-section, the chamber 89 being located between the longitudinal web 88 and the side wall 55 and the flush chamber 90 between the longitudinal web 88 and the side wall 54. Thus the flowing cooling medium 42 distributes itself as it passes through the flow channel 105 between the flow areas 25 and 26 above the cooling member 147 in section 96, and is prevented by the separating wall 153 located in the area of the support baffle 58 from flowing further into the subsequent flow area 27. Due to the build-up of vacuum already described in FIG. 10 in the inner space 56 of the cooling device 16, the cooling medium 42 flows between the cooling fins 125 of the cooling member 147 in section 96 down in the direction of the base plate 53 and flows around the article 7 in counter-flow to the flow direction in the flow area 25. The cooling medium 42 is again shown schematically by the arrow 97 and passes in the flow area 26 from the chamber 89 in section 96 into the flush chamber 90 of section 95. This alternating flow around the article 7 continues now similarly from flow area to flow area, so that the connection of the individual flow areas is in turn formed by the further flow ducts 106–110.

A particularly good cooling effect or cooling of the article 7 is achieved in that the cooling medium 42, during its passage through the entire cooling chamber 17 of the cooling device 16 must flow through in each of the sections 95 or 96 through one of the cooling members 147 located there, and thus the heat taken up from the article 7 can be directly removed in the inner space 56 of the cooling device from the gaseous cooling medium 42. Due to this direct heat removal from the article 7 to the cooling medium 42, the heat capacity of the cooling medium 42 is sufficient, as the absorbed heat is given off directly again in each of the individual flow areas 25–30 or 35' to one of the cooling members 147. Thus removal of the heat occurs in its own separate circuit. Furthermore, also conduction losses, such as for example occur during radiation, can be avoided by cooling units and their pipes located outwith the cooling device 16.

As is further to be seen from FIGS. 14 and 15, the casing 36 can be covered on the surface facing away from the inner space 56 by additional insulating members 112, in order to achieve even better insulation of the inner space 56 from the space surrounding the casing 36. The coolant 126 flowing through the cooling tubes 124 has temperatures of below 0° C., preferably between −15° C. and −30° C., and is preferably in the form of a liquid coolant 126. Furthermore, independently of this it would be possible for each of the individual cooling members 147 formed from the cooling pipes 124 and the cooling fins 125 located thereon, to be itself designed as an evaporator and thus to achieve even lower temperatures, such for example as up to −40° C. The coolant passing through the cooling tubes 124 is in this case present in a gaseous consistency. By means of this arrangement for example further devices in the coolant circuit can be omitted or saved.

In the illustration in the individual FIGS. 11–15, individual parts or elements of the cooling device 16 have been partly or entirely omitted for better clarity in order to be able better to illustrate the function and the flow according to the invention of the cooling medium 42 through the individual flow areas 25–30.

Figure 16:
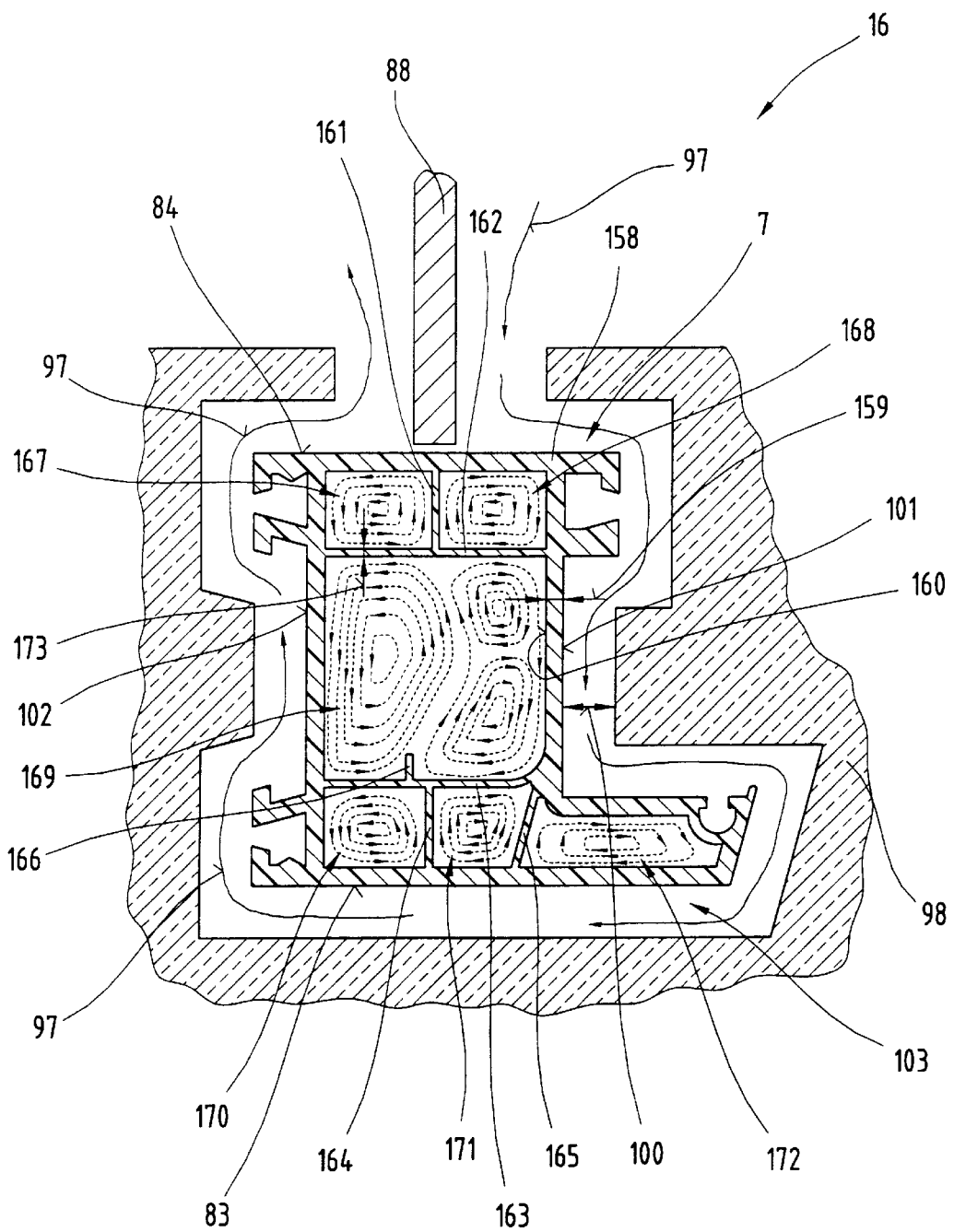
FIG. 16: a possible profile cross-section of the article in end elevation, in section and with the heat progression entered schematically.
Figure 17:
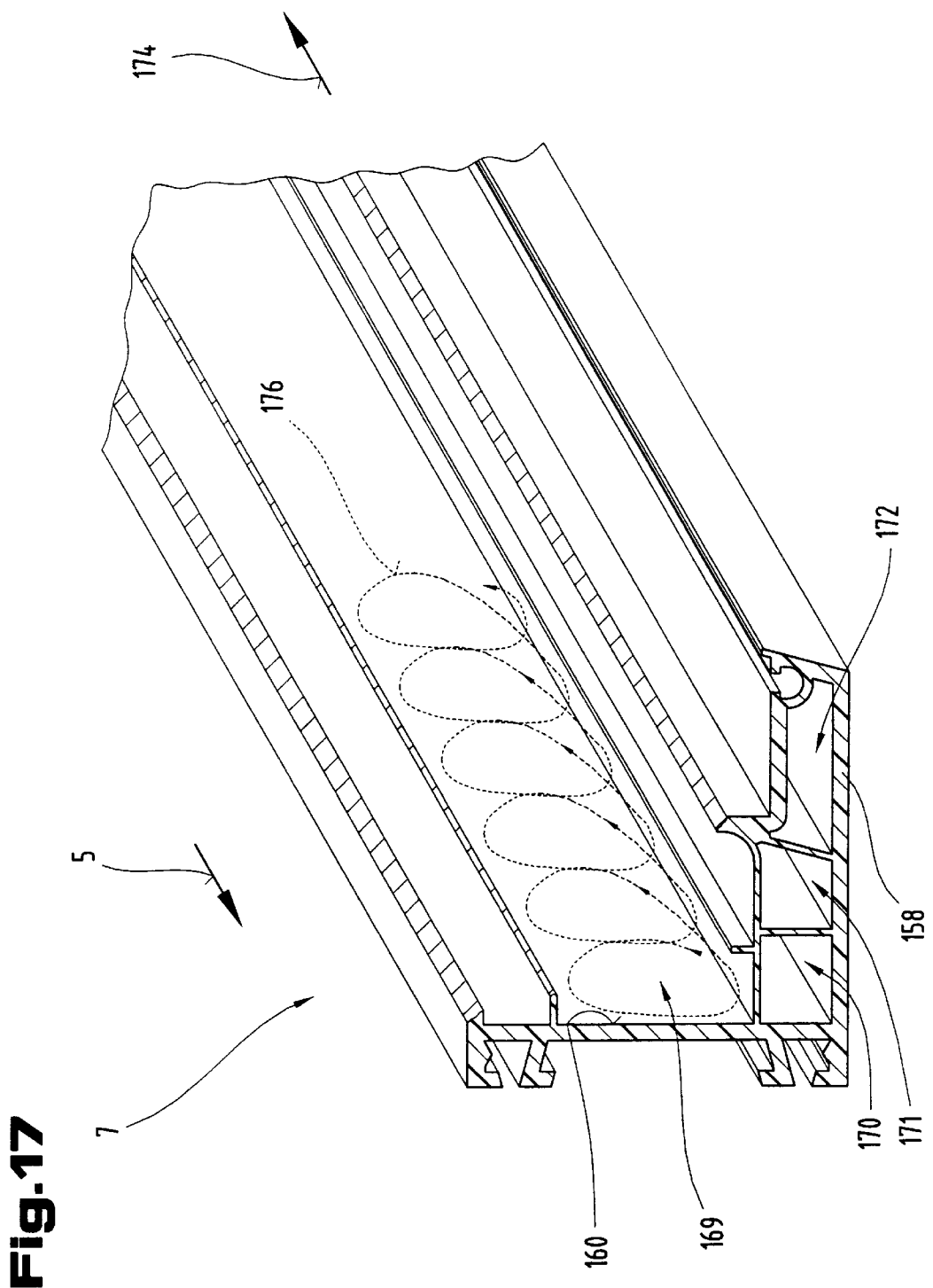
FIG. 17: the profile of the article according to FIG. 16 in pictorial view, in partial section.

In FIGS. 16 and 17 the cooling procedure of the article 7 as it passes through the cooling device 16 is shown schematically by the cooling medium 42 indicated in a simplified form by the arrows 97, identical reference numbers to those in FIGS. 1–15 being used for identical parts. It should be mentioned at this point that the profile form of the article 7 shown has only been selected by way of example from a plurality of possible profiles, and the following cooling procedures described in more detail are to be applied similarly to other profile contours 77.

In the region of the outer contour form of the article 7, the insulating member 98 is indicated schematically, the surfaces or side surfaces of the insulating member 98 being spaced apart from the contour form or profile contour 77 of the article 7 by the roughly uniform spacing 100.

The article 7 consists of an outer enclosed periphery 158 with a roughly uniform wall thickness 159 continuous all around, which surrounds a hollow chamber 160. This hollow chamber 160 can be subdivided into further small chambers 167–172 by webs 161–166. In this case the web 161–166 has a smaller wall thickness 173 than the wall thickness 159 of the periphery 158.

Due to the differences in wall thickness from the outer periphery 158 to the webs 161–66, thus the periphery 158 has a higher heat storage capacity compared to the webs 161–166. Due to the rapid cooling in the region of the profile contour 77 of the article 7 due to the intensely cooled cooling medium 42, a rapid heat transfer from the outer periphery 158 to the flowing cooling medium 42 occurs in this area. Thus the outer lateral zones of the periphery 158 are rapidly cooled and, constrained by volume, there is a rapid heat removal from the periphery 158 to the cooling medium 42.

The individual webs 161–166 located in the hollow chamber 160 accordingly, seen in terms of cross-section or of volume have a smaller proportion in comparison to the outer periphery 158. The individual webs 161–166 can give the heat stored therein directly to the passing cooling medium 42, so that, due to the rapid cooling of the outer periphery 158, the ambient air contained within the individual chambers 167–172 is set in a flow movement in the form of a circular movement as schematically shown by arrows. It can be seen from this that in chambers 167, 168 or 170–172 adjacent to one another, the air contained is set in motions contrary to one another. If one now considers the web 164 between the two chambers 170 and 171, the air flowing along the periphery 158 cools more quickly and flows in the area of the web 164, due to a renewed take-up of heat, forward in the direction of the web 163 and heats up as it passes the web 164 and transports this absorbed heat in the direction of the web 163. In the chamber 169 between the webs 162 and 163 there is formed, due to the web 166 eccentrically located therein an asymmetrical flow distribution in the chamber 169, as is likewise indicated by broken arrows schematically. Further transport of the heat, from the web 163 in the direction of the web 162 occurs in turn due to the air rising roughly in the central area of the chamber 169, and which is deflected in the area of the web 162 in the direction of the side surfaces 101 or 102 of the periphery 158. In both these areas the downward-flowing air is again cooled and drops, due to gravity again in the direction of the web 163, so that the contrary flow movement is reinforced.

In both chambers 167 and 168 and the web 161 located therebetween, there is likewise a further transport of the stored heat from the web 168 via the web 161 to the upper side 84 of the periphery 158. In this way, from the underside 83 of the article 7, there is a continuous transport of the heat stored therein in the direction of the upper side 84. Due to the rapid and above all intensive cooling of the outer periphery 158, this can be regarded in terms of volume as a relatively large "cold store", which absorbs the heat stored in the hollow chamber 160, particularly the webs 161–166, and gives it off to the passing cooling medium 42.

In order now further to reinforce the cooling effect within the individual chambers 167–172, the air contained in the entire hollow chamber 160 or in the individual chambers 167–172, by means of an additional evacuation of the same in the direction of the extrusion tool 3, can bring about an even better heat exchange between the heat stored in the hollow chamber 160 and the periphery 158. This additional evacuation in the hollow chamber 160 or in the individual chambers 167–172 can if necessary in itself form an independent solution according to the invention and is shown only schematically in FIG. 17 for the chamber 169. Thus the additional evacuation of the air in the chamber 169 is effected contrary to the extrusion direction, arrow 5, in accordance with an arrow 174 in the direction of the nozzle lip of the extrusion tool 3 by means of an evacuation device 175 shown schematically in FIG. 1, as known from prior art. Thus for example there may be provided in an end wall extending vertically to the extrusion direction, arrow 5, of the extrusion tool 3 within a hollow space surrounded by the nozzle slot, an inlet for a suction pipe connected to a suction inlet of the evacuation device 175. This suction pipe, with an interposed heat insulation, can be passed through the extrusion tool 3. Thus the inlet into the suction pipe is to be located in the extrusion direction, arrow 5, at a spacing in front of the nozzle lip of the extrusion tool 3.

Due to the superimposition of the roughly circular movement of the air with the additional evacuation in the direction of the extraction tool 3, there is formed for the air contained in the individual chambers 167–172 a progressive movement in the manner of a helical shape, so that also an additional longitudinal movement of the air in the direction of the article 7 occurs, as indicated schematically by a broken line 176. In this way there occurs a more intense heat transfer between the hollow chamber 160 and the externally closed periphery 158. In addition, via the entire longitudinal extension of the article 7, from the saw or the caterpillar pull-off 6, in the direction of the extrusion tool 3, already cooled air is continuously conveyed in the direction of the extrusion tool 3, said air after emergence of the article 7 out of the cooling device 16 being already located within the hollow chamber 160. Thus within the hollow chamber 160 or the individual chambers 167–172 there is achieved over the entire longitudinal extension of the article 7 an additional heat exchange. Thus the already intensively cooled article 7 after its emergence from the cooling device 16 and the caterpillar pull-off 6 or the separating device subsequent to it, acts itself as a cooling member or as a cold store for the ambient air admitted at the end of the article 7, which during the continuous progressive movement in the direction of the extrusion tool is firstly cooled and thereupon absorbs heat from the article or profile and thus cools it.

Thus for example lateral areas of the periphery 158 can have in the region of the outer profile contour 77 a temperature of +20° C. to −40° C., and lateral areas in the region of the hollow chamber 160 can have a temperature of about +20° C. to +90° C. The individual webs 161–166 can at the same point in time still have temperatures of about 140° C. to 200° C. From these various temperature data it can be seen that a high temperature drop exists from the hollow chamber 160 in the direction of the outer profile contour 77 of the article 7. Furthermore the speed of the air movement within the chambers 167–172 can come, depending on the size and geometric design of the individual chambers, to between 0.001 m/s and 0.3 m/s preferably between 0.01 m/s and 0.1 m/s.

Independently of this, it would further be possible to arrange the longitudinal web 88, as is shown in broken lines in FIG. 9, either between the side wall 54 in the direction of the plane 87 to a point close to the profile contour 77 or from the side wall 55 in the direction of the plane 87 to a point close to the contour 77 in the longitudinal direction of the cooling device 16. Due to this optional arrangement of the longitudinal webs 88 respectively from the side walls 54 or 55 in the direction of the plane 87, in these embodiments also a corresponding separation of the individual flow areas into the chambers 89 or flush chambers 90 is achieved. Depending on the arrangement of the individual longitudinal webs 88, the arrangement of the cooling members or flow ducts and insulating members should be correspondingly selected.

Steel and/or iron materials of corresponding quality can be used as materials for the previously-described end walls 38–41, the support baffles 57–61 or 113–117 and the base plate 53. For example, however, also aluminium and aluminium alloys can be used for the base plate 53, these materials being produced in a casting process. The side walls 54, 55, the cover plate 52, the longitudinal web 88 and the separating walls 152–157 can preferably be produced from plexiglas. Preferably however iron materials in conjunction with plexiglas are used, in order in this way during passage of the article 7 through the cooling device 16, for example when aluminium materials are used, to avoid or prevent the deposit of microfine particles of aluminium oxide between the aperture 82 and the outer contour form of the article 7 in the support baffles. Due to these deposits surface damage to the article 7 can occur. In order to achieve an even better surface quality of the article 7, or a longer service life of the support baffles 57–61 or 113–117 and of the end walls 38–41, it is also possible to provide the surface of the aperture 82 facing the article with a coating.

Figure 18:
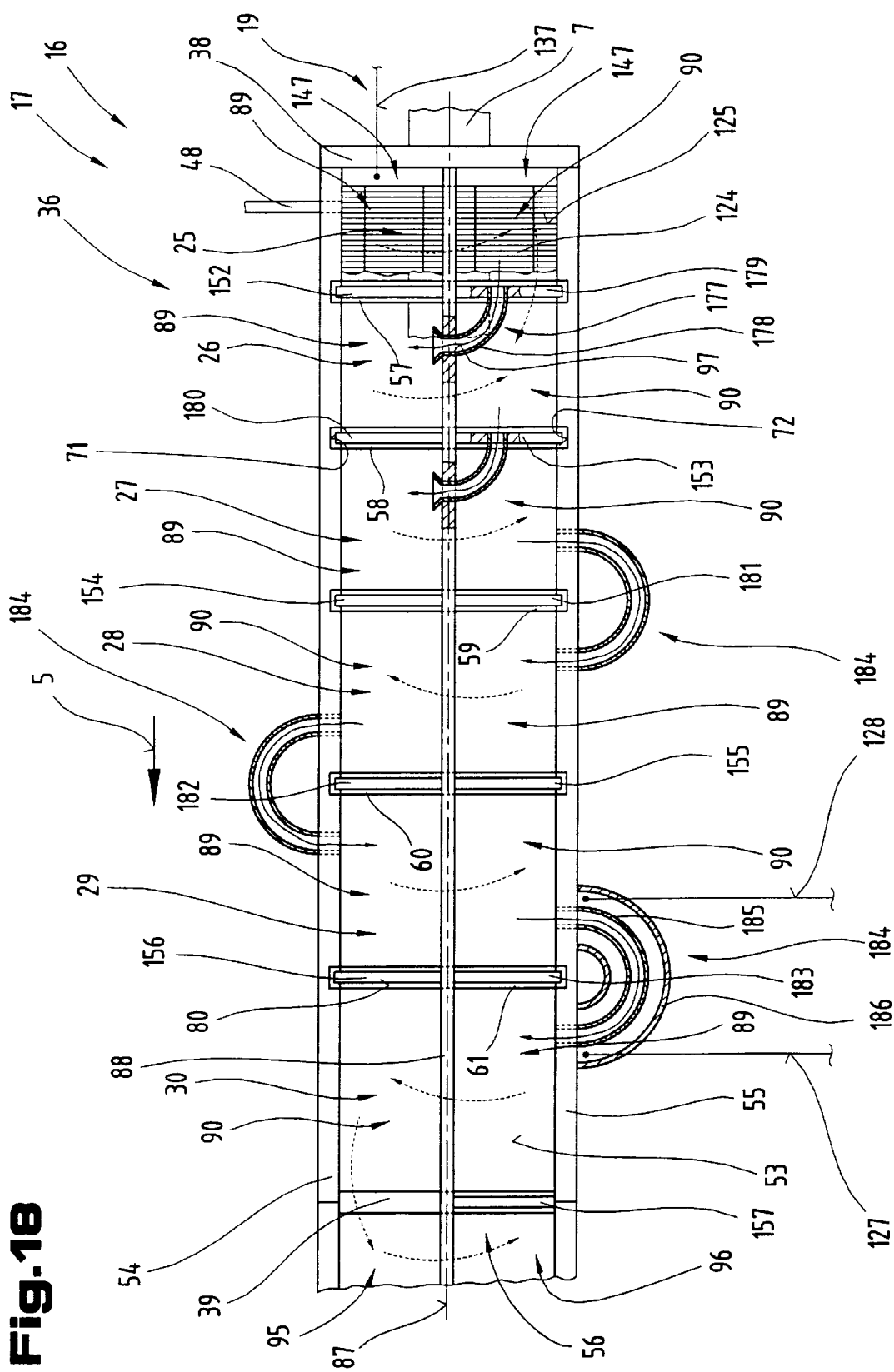
FIG. 18: a further embodiment of an if necessary independent solution according to the invention of the cooling and if necessary calibrating device in plan view, in partial section and simplified view.

FIG. 18 shows a further possible design of a cooling device 16, identical reference numbers to those used in FIGS. 1–15 being used here for identical parts. The constructional variants described in this design can if necessary respectively represent in themselves independent solutions according to the invention.

As is to be seen from this simplified illustration, the cooling device 16 consists of the cooling chamber 17 or 18 and is shown in plan view with the cover plate 52 raised.

The casing 36 again consists of the side walls 54, 55, the base plate 53, the end walls 38 or 39 and the cover plate 52 (not shown). Furthermore, in this Fig. illustration of the insulating members 81 or 98, 99 and 112 have been omitted for better clarity. The inner space 56 enclosed by the casing 36 is subdivided in the extrusion direction, arrow 5, i.e. in the longitudinal direction or longitudinal extension of the casing 36 by the support baffles 57–61 into the flow areas 25–30. Further subdivision of the individual flow areas 25–30 is carried out by the longitudinal web 88 located in the plane 87 into the two sections 95 or 96 between the plane 87 and the side wall 54 or the plane 87 and the side wall 55. Due to this subdivision into the sections 95 or 96, each of the individual flow areas 25–30 is again subdivided into the chamber 89 or flush chamber 90.

Furthermore, as also already described in FIGS. 10–15, there is again located between the upper edge 80 of the individual support baffles 57–61 under cover plate 52 an independent cooling device in the form of two cooling members 147, which consist of the cooling pipes 124 with the cooling fins 125 located thereon, formed continuously from the end wall 38 as far as the end wall 39 or 41. In this embodiment also there is an overflow of the cooling medium 42 transversely to the extrusion direction, arrow 5, around the article 7 to be cooled, the flushing taking place in the flow areas 25 to 27 respectively from section 95 towards section 96, and the connection being via a pipe connection 177 between the flow area 25 and 26 from the flush chamber 90 in section 96 towards the chamber 89 in section 95 of the flow area 26, through a pipe tube 178. Thus the separation between the flow area 25 to the flow area 26 by the support baffle 57, the cooling ribs 125 located above the support baffle 57 of the cooling members 147 and the separating wall 152 or 179 located between the cooling members 147 and the cover plate 52. Further transport of the cooling medium 42, which is schematically indicated again by the arrow 97, occurs after flushing of the article 7, from the chamber 89 into the flush chamber 90 in the flow area 25 through the pipe connection 177 between the separating wall 179 and the longitudinal wall 88 towards the chamber 89 in the section 95 of the flow area 26. Also the further flow areas 27–29 connecting to the flow area 26 are likewise separated or sealed off from one another by independent separating walls 153–156 and 180–183.

Thus the flow around or flushing of the article 7 in the successive flow areas 25–27 is effected in the manner of a helical line, in each of the individual flow areas 25–27, transversely to the passing article 7 in respectively the same flushing direction.

A further possible and if necessary independent embodiment of a pipe connection 184 is shown between the flow areas 27–30, and takes place outside the casing 36. In this embodiment of the pipe connection 184 there is again a counter-flow flushing of the passing article 7 in the directly succeeding flow areas 27–30 transversely to the passing article 7. Thus the gaseous cooling medium 42 enters from the flush chamber 90 of the flow area 27 through the pipe connection 184, such for example as a tube or a hose, into the flush chamber 89 of the flow area 28 immediately succeeding the flow area 27, in the same section 96. Flow around the passing article towards the flush chamber 90 in the flow area 28 is again effected just as described in detail in FIGS. 10–15.

A further additional and if necessary independent solution for cooling the cooling medium 42 is shown between the flow areas 29 and 30, the pipe connection 184 being effected by a tube 185, which is surrounded by an additional tube 186 and thus forms a double-walled tube. Thus it is possible to connect the interspace between the outer surface of the tube 185 and the inner surface of the tube 186 with an independent coolant 126 for example in the form of a counter-flow cooler with its own feed pipes 127 or discharge pipes 128, so that the cooling medium 42 flowing through the tube 185 when transferring from the flush chamber 90 of the flow area 29 into the chamber 89 of the flow area 30, is additionally cooled. Further cooling of the cooling medium 42 is effected in the inner space 56 of the casing 36 by the cooling members 147.

Figure 19:
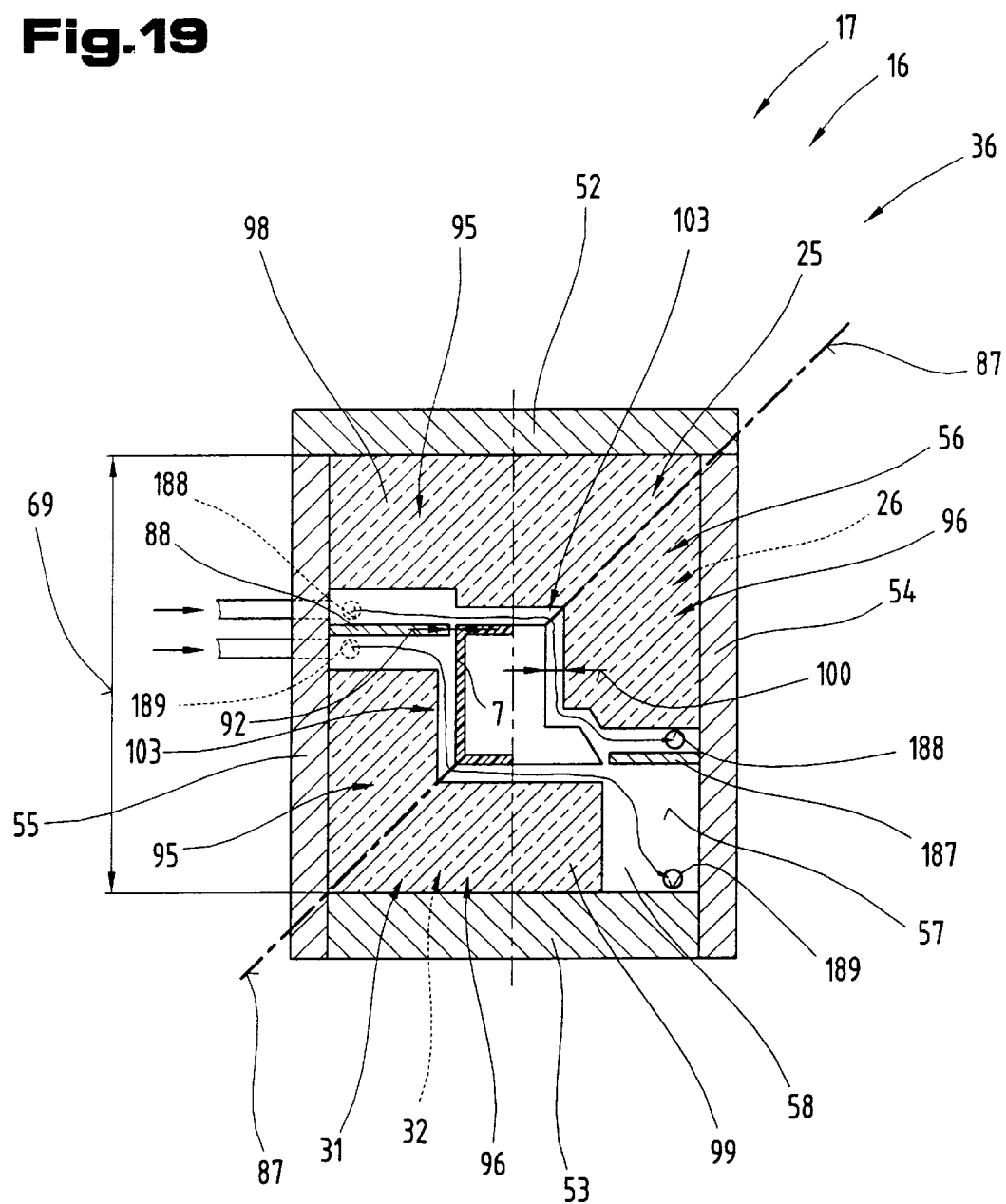
FIG. 19: another design of the if necessary independent solution according to the invention of the cooling and if necessary calibrating device in side elevation, in section and in simplified schematic view.

In FIG. 19 there is schematically shown a further if necessary independent solution of the cooling device 16 with the cooling chamber 17 and its casing 36, in a simplified schematic view, identical reference numbers to those in FIGS. 1–18 being used for identical parts.

The casing 36 of the cooling chamber consists of the side walls 54, 55, the cover plate 52 and the base plate 53, which surround or form the inner space 56 of the casing 36. The support baffle 57 extends over the entire distance 69 between the surfaces facing one another of the cover plate 52 and the base plate 53. Furthermore this part section of the inner space 56, which is defined by the side walls 54, 55, the cover plate 52, the base plate 53, the end wall 38 and the support baffle 57, is subdivided by the longitudinal web 88, the article 6 or a further longitudinal web 187 into two independent flow areas 25–31, the flow area 25 in this embodiment being associated with the cover plate 52, and the flow area 31 with the base plate 53. The immediately succeeding part section of the inner space 56 is defined in the direction of extrusion, arrow 5, by the support baffle 57 or 58 in its longitudinal extension. Due to the separation of the individual part sections into respective separate flow areas 25 or 31, the flow area 25 is in a flow connection with the immediately subsequent partial section via an aperture 188 with the flow area 26 and the flow area 31 with the flow area 32 via an aperture 189. The flow areas 25 or 31 are subdivided by the planes 87 aligned roughly diagonally to the casing 36 into the respective sections 95, 96. The individual apertures 188 or 189 are respectively offset to one another in only one section 95 or 96 of the respective flow area 25, 26 or 31, 32, so that in turn flushing of the article 7 aligned transversely to the extrusion direction, arrow 5, takes place. In this way each of the individual immediately succeeding sections is respectively subdivided into two independent flow areas.

Again there are located in the inner space of the casing 36 the insulating members 98, 99 which are so designed that between the outer contour form or the outer contour of the article 7 and the side faces facing it of the insulating members 98, 99, the duct 103 with the uniform spacing 100 is formed between them. Due to this separation into the two independent flow areas 25, 26 or 31, 32 it is possible to flush those surface areas of the article 7 which are located in the respective flow areas 25, 26 or 31, 32, for example with a cooling medium 42 of a different temperature. Thus the pipe connection between the individual flow areas 25, 26 or 31, 32 is provided by the schematically indicated apertures 188 or 189 in the individual support baffles 57–61. A corresponding offsetting of the apertures 188 or 189 in the individual support baffles 57–61 is mutually necessary, in order to ensure flow of the cooling medium 42 around and transversely to the longitudinal direction or extrusion direction, arrow 5, of the article 7. The arrangement of the longitudinal webs 88, 187 and of the apertures 188 or 189 depends on the profile shape of the article 7 and in this case is only selected by way of example. In the embodiment shown here, the longitudinal web 88 extends from the side wall 55 vertically to the side wall 55 in the direction of the article 7 and is aligned parallel to the direction of extrusion, arrow 5. The longitudinal web 187 extends from the side wall 54 vertically thereto in the direction of the article 7 and is likewise aligned parallel to the extrusion direction, arrow 5. Between the longitudinal webs 88, 187 and the article 7 there is again to be provided the slot with the corresponding thickness 92, in order on the one hand to ensure a minimum flow of the gaseous cooling medium 42 between the longitudinal web 88, 187 and the outer surface or outer contour form of the article 7, without however the occurrence of any damage to the article 7 during its passage through the cooling device 16. The longitudinal webs 88, 187 can however naturally be inserted in other positions than those shown here in the inner space 56 of the casing 36, in order to divide them into the separate flow areas 25, 26 or 31, 32.

This additional arrangement of the longitudinal web 187 relative to the longitudinal web 88 can also serve for example better to cool heavier or thicker constructed peripheral portions of the article 7 in areas, as has been previously described with the cooling media 42 of different temperatures. Independently of this, it would also be imaginable to provide a higher throughput of coolant medium in one of the two separated flow areas 25, 26 or 31, 32 in order in this way to achieve an increased heat removal from the article 7. Due to this controlled and optionally different cooling of the surface areas of the article 7, more controlled cooling can be achieved, so that for example warping of the extruded article 7 is reliably avoided. Furthermore, by means of the separate guidance of the cooling medium 42, an increased heat removal from the article 7 is achieved.

An essential factor in all the previously described embodiments for the cooling device 16 is that the gaseous cooling medium 42 flushes around the article 7 during its continuous forward movement in the plurality of successively located flow areas 25–35' in the extrusion direction, arrow 5, and the flow around the article 7 is respectively effected in the peripheral direction of the article 7 to be cooled. Thus the flow direction in each of the successive flow areas 25–35' can be either identical and/or in counter-flow, in order to achieve the desired cooling of the article 7.

It has proved particularly advantageous if the spacing 100 between the outer surface or the outer contour form of the article 7 and the surfaces facing it or side surfaces of the insulating members 81, 98, 99 or of the casing 36 is roughly identical in size, or only deviates by a fraction of the spacing 100. This ensures that the cross-sectional width of the coating of cooling medium 42 flushing round the article 7 in the planes lying vertically to the extrusion direction in the individual flow areas 25–35' is roughly of the same size. In this way a uniform heat removal from the article 7 to the cooling medium 42 is ensured. The removal of heat from the article 7 can also be achieved by a higher flow speed of the cooling medium 42 in the individual flow areas 25–35', compared to the article 7 passing through the individual flow areas 25–35'. Furthermore, the flow speed of the cooling medium 42 can be less in each of the flow areas 25–35' than in the area of the individual pipe connections such for example as the flow ducts 105–110 or 118–120. In addition, the cooling medium 42 entering the flow area can be separate from the cooling medium 42 emerging from the flow area. Furthermore, a quantity of cooling medium 42, which flows around the article 7 in each of the flow areas 25–35' can be a multiple of that part quantity of the cooling medium 22, which passes through the slot between the article 7 and the longitudinal web 88, 187.

Figure 20:
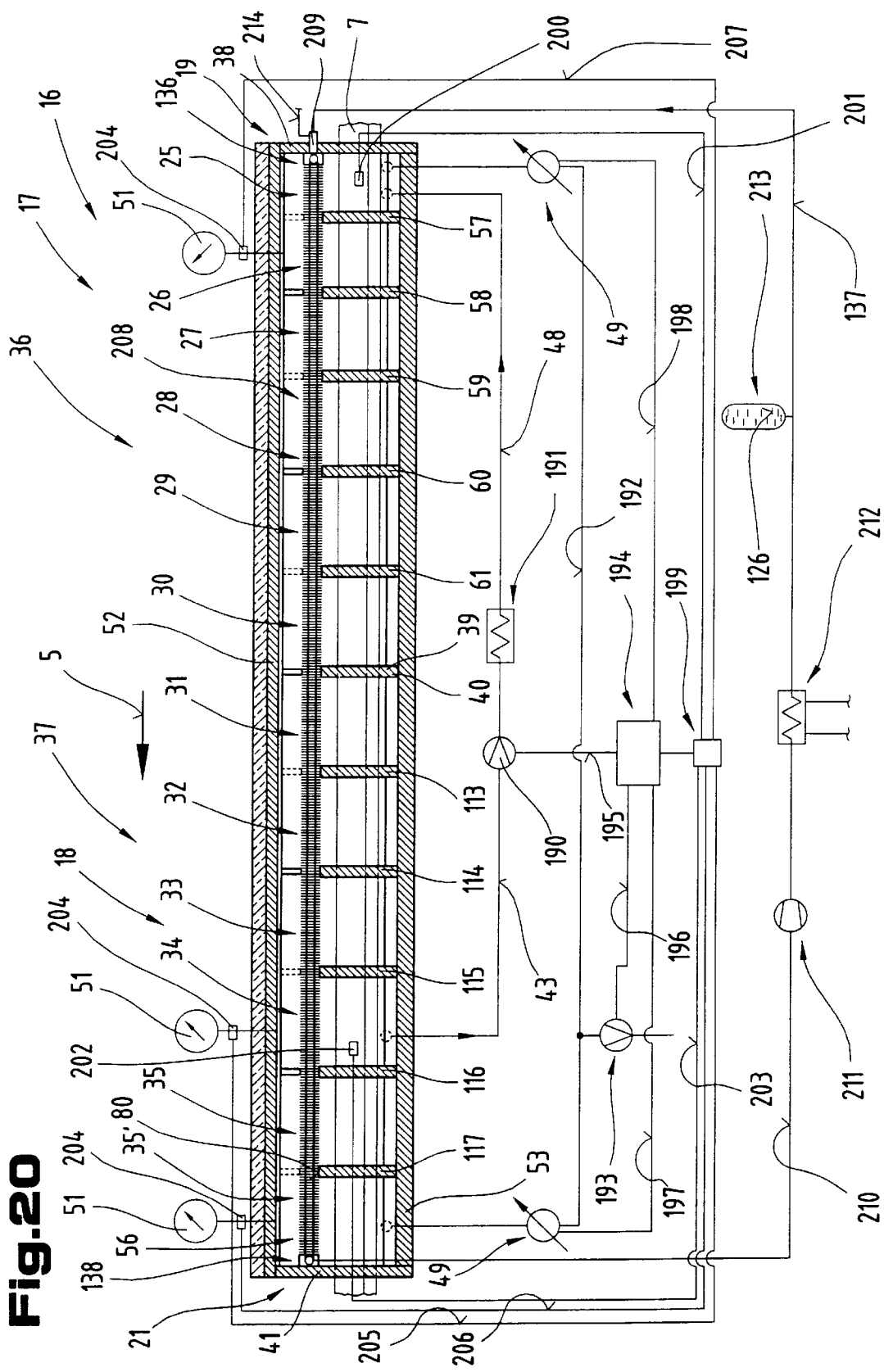
FIG. 20: a further schematic sketch of another and if necessary independent solution according to the invention of the cooling and if necessary calibrating device in side elevation, in section and in simplified, schematic view.

FIG. 20 shows another possible design of the cooling device 16, in which identical reference numbers to those used in FIGS. 1–15 have been used for identical parts, and this design can if necessary represent in itself an independent solution according to the invention.

In this illustration the cooling device 16 is shown with its casings 36, 37 forming the cooling chambers 17 or 18 in schematic simplified view in side elevation and in section, and for reasons of clarity certain portions of the installation have been omitted. The cooling chambers 17 or 18 are formed from the cover plate 2, the base plate 53, the laterally located side walls 54 or 55 and the end walls 38–41, which thus surround the inner space 56 of the cooling device 16. Located in the inner space 56 are the support baffles 57–61 or 113–117, which divide these into the flow areas 23–35' in the extrusion direction, arrow 5. The build-up of the vacuum of low pressure in the inner space 56 again occurs from the entry area level 19 of the article 7, i.e. the flow area 25, as far as the flow area 34. Thus the vacuum in the flow area 25 is still very low, for example between 0 bar and −0.1 bar, and increases per flow area by 0.02 bar to 0.1 bar and in the outlet area of the medium 42 i.e. the flow area 34, comes to between −0.1 bar and −0.5 bar, preferably −0.2 bar. Due to this low vacuum in the entry area 19 of the cooling chamber 17, the still highly-viscous article is not yet exposed to any high vacuum, so that no alteration in shape due to the vacuum can occur, and this does not lead to any inflation of the profile. Due to the further cooling of the article 7 passing through the cooling device 16, the vacuum can increase from flow area to flow area, in a corresponding manner or the absolute pressure can reduce, as with continuous cooling a consolidation and thus rigidification of the profile occurs.

The basic construction of the cooling device 16 corresponds to that already described in FIG. 10, whereby however the devices for build-up of vacuum and the controls for the cooling member in the embodiment here described have been correspondingly modified. The cooling medium 42 flows in this case in a preferably closed circuit, the gaseous cooling medium 42 being fed to the flow area 25 and the inlet area 19, and flowing around the article 7 passing through the cooling device 16 in each of the individual flow areas 25–34 transversely to the extrusion direction, arrow 5, and being suctioned out of the cooling device 16 in the flow area 34. For this purpose the discharge pipe 43, proceeding from the flow area 34, is connected with a circulating device 190, such for example as a fan, a turbine, a vacuum pump or the like, which ensures the required flow of cooling medium 42 through the individual flow areas 25–34. In connection with the circulating device 190 there is located in the feed pipe 48 if necessary an independent heat exchanger 191, which if necessary still removes heat from the flowing cooling medium 42, which has for example been passed by friction or ambient conditions to the cooling medium 42. The feed pipe 48 is in a flow connection with the flow area 25, so that now an enclosed circuit proceeding from flow area 25 to the flow area 34 and discharge pipe 43 and feed pipe 48 is present. In this way the cooling medium can be circulated a number of times in a predetermined period of time, this quantity of cooling medium being a multiple of that quantity serving to maintain the vacuum.

In order to be able correspondingly to adjust the build-up of vacuum from the flow area 25 to the flow area 34, a further pipe 192 likewise communicates with the flow area 25 and/or with the feed pipe 48. This pipe 192 also communicates with the flow area 35' and is additionally connected to a further vacuum pump 193, so that extraneous air entering both from the two flow areas 35, 35' through the end wall 41 and on the other hand extraneous air entering likewise in the flow area 25 in the region of the end wall 38 can be evacuated. Furthermore it is indicated schematically that between the flow area 25 and the vacuum pump 193 and between the flow area 35' and the vacuum pump 193 there can respectively be arranged an independent regulating device 49, in order correspondingly to be able to adjust and regulate the quantity of air or of the cooling medium 42 to be evacuated.

As further indicated schematically, associated with the cooling device 16 is a control device 194, which is connected by a pipe 195 to the circulating device 190, via a further pipe 196 to the vacuum pump 193 and via the pipes 197 and 198 with the regulating devices 49. In this way there can be an optional triggering or regulation of the individual components, in order to be able correspondingly to control and monitor the course of the method, i.e. the controlled and monitored cooling procedure for the extruded article 7.

Furthermore if necessary and in addition a measurement value conversion device 199 may be associated with the control device 194, from which corresponding data or signals are transmitted by a sensor 200 located in the flow area 25 via a line 201 and via a further sensor 202 in the flow area 34 via a line 203. The two sensors 200 or 202 can for example determine the most varied measurement values, such for example as temperature, speed, pressure and the like and can transmit the respective measurement values to the measurement value conversion device 199. A corresponding transmission or conversion of the measurement values is effected at a control device 194, which in turn controls the corresponding portions of the installation, in order to be able properly to maintain the pre-set operational parameters.

Further sensors 204 can be associated with the display instruments 51, which in turn communicate via various lines 205–207 with the measurement conversion device 199. These sensors 204 likewise transmit measurement values such for example as the vacuum obtaining in the inner space 56 to the measurement conversion device 199, which correspondingly processes the received measurement values for the control device 194 and transmits them thereto.

In order now to be able to cool the inner space 56 of the cooling device 16, again an independent cooling member 208, for example in the form of one or a plurality of finned tubes, is located within the cooling chambers 17, 18, in this embodiment the cooling member 208 itself being designed as an evaporator tube. For this purpose a closed circuit for the independent coolant 126 is provided, the feed pipe 137 communicating in the region of the end wall 38 with the end face 136 of the cooling member 208. Between the end face 136 and the feed pipe 137, there is located in the area of the end wall 38, an injector device 209 for the coolant 126, shown schematically, said coolant being for example brought in liquid form via the feed pipe 137 into the region of the end face 136 and flowing there by means of the injector device 209 into the cooling member 208 and thus evaporating, so that an extreme temperature drop is generated. In this way a certain quantity of heat is extracted from the cooling member 208, which also likewise extracts heat from the passing cooling medium 42 upon each transition from one flow area to the immediately following flow area, so that the article 7 passing through is correspondingly cooled.

The end face 138 of the cooling member 208 facing the end wall 41 in the outlet area 21 communicates via a discharge pipe 210 with a condenser 211, such for example as a compressor or the like, which again condenses the expanded coolant 126 and passes it on to a subsequent heat exchanger 212, such for example as a cooling device or a condenser. This heat exchanger 212 extracts from the coolant 126 the heat passed to the coolant 126 by the condensing procedure, whereupon then the compressed and cooled coolant 126 can if necessary be intermediately stored in a storage container 213 for further progress of the process. As is further indicated schematically, the injector device 209 can likewise communicate via a pipe 214 with the measurement conversion device 199 or the control device 194, in order to be able correspondingly to control or regulate the expansion process of the coolant 126 in the cooling member 208. During this cooling procedure of the cooling member 208, caused by the expansion of the coolant 126, temperatures of less than 0° C., preferably between −15° C. and −40° C. are achieved. This leads to an even more intensive cooling of the inner space 56 and thus also of the article passing through it.

In order to monitor the vacuum built up also in the flow areas 35, 35', or to be able correspondingly to adjust it via the additional vacuum pump 193 and the regulating device 49, associated with each area is also one of the display instruments 51, in order for example to be able to read off or monitor the extraneous air extraction and the vacuum built up. For the type of flow around the article 7 by the cooling medium 42, reference is made to the description of FIGS. 10–15, as this occurs in an identical manner.

In all the procedures of through-flow and flow around previously described, a turbulent flow of the passing cooling medium 42 is preferably selected, in order in this way to achieve an intensive and reliable cooling of the article 7. Thus quantities of cooling medium between 50 M3/h and 600 M3/h, preferably between 100 M3/h and 300 M3/h, are conveyed through the cooling device 16. All media known from prior art can be used as coolant 126, and can be used both in gaseous and in liquid form or in an aggregated condition combined from the two. In the case of liquid media care should be taken that the freezing or solidification temperature lies below the process temperature, in order to ensure reliable cooling.

There is further achieved by selection of a turbulent flow of the cooling medium 42 within the casing 36, 37, particularly in the surface area of the article to be cooled, a high heat transfer from the solid body to the cooling medium moved or flowing relative thereto, flows generally of a Reynolds number of more than 2320 being considered as turbulent. This high heat transfer is especially achieved by the turbulent flow of the cooling medium 42 in the area of the surface of the article.

During the turbulent flow a substantial proportion of the heat to be extracted is removed by so-called turbulence spheres in the flowing medium from the solid body, the heat transfer coefficient achieved thereby in turbulent flow being generally greater than in laminar flow. An additional factor to be taken into account for the heat transfer coefficient arises from the inflow direction of the article, the design and shape as well as the surface quality of the surface of the article. In addition, the inflow direction selected is of particular importance as in the case of an angular, particularly transverse inflow or flow around the article an even higher heat transfer coefficient can be achieved than in the case of a flow direction parallel to the article. Due to this transverse flow, eddying and an entailed turbulent flow of the cooling medium occurs additionally at profile sections projecting from the profile or recessed therein. From this there results the so-called Nussel's number, by means of which the heat transfer coefficient can be calculated and further therefrom the heat flow can be calculated. With respect to the heat transfer, reference is further made to "DUbbel—Taschenbuch fUr den Maschinenbau, 15th corrected and extended editgion by springer Verlag, 1983", and reference is made to the disclosure on pages 244 to 248 therein.

Naturally the embodiments are described above and the variants and differing constructions shown in these embodiments can each form in themselves independent solutions according to the invention, and may be optionally combined with one another.

Finally as a matter of order, it is pointed out that for better understanding of the function of a cooling device according to the invention, many parts thereof have been illustrated schematically and disproportionately enlarged.

Above all, the constructions shown in FIGS. 1; 2–6; 7; 8, 9; 10–15; 16; 17; 18; 19; 20 can form the subject matter of independent solutions according to the invention. The purposes and solutions in this respect are to be seen in the detailed descriptions of these figures.

List of Reference Numbers

1. Extrusion Installation
2. Extruder
3. Extrusion Tool
4. Calibrating Table
5. Arrow
6. Caterpillar Pool-off
7. Article
8. Support surface
9. Roller
10. Travelling Rail
11. Displacement Drive
12. Calibrating Device
13. Calibrating Tool
14. Calibrating Tool
15. Calibrating Tool
16. Cooling Device
17. Cooling Chamber
18. Cooling Chamber
19. Entry Area
20. Transitional Area
21. Outlet Area
22. Plastic
23. Storage Container
24. Conveyor Worm
25. Flow Area
26. Flow Area
27. Flow Area
28. Flow Area
29. Flow Area
30. Flow Area
31. Flow Area
32. Flow Area
33. Flow Area
34. Flow Area
35. Flow Area
35'. Flow Area
36. Casing
37. Casing
38. End Wall
39. End Wall
40. End Wall
41. End Wall
42. Cooling Medium
43. Discharge Pipe 44. Vacuum Pump
45. Cooling Device
46. Heat Exchanger
47. Cooling Unit
48. Feed Pipe
49. Regulating Device
50. Additional Pipe
51. Display Instrument
52. Cover Plate
53. Base Plate
54. Side Wall
55. Side Wall
56. Inner Space
57. Support Baffle
58. Support Baffle
59. Support Baffle
60. Support Baffle
61. Support Baffle
62. Length
63. Length
64. Length
65. Length
66. Length
67. Length
68. Support Surface
69. Distance
70. Width
71. Aperture
72. Aperture
73. Thickness
74. Width
75. Spacing
76. Width
77. Profile Contour
78. Height
79. Height Differential
80. Upper Edge
81. Insulating Member
82. Aperture
83. Underside
84. Upperside
85. Height
86. Distance
87. Plane
88. Longitudinal Web
89. Chamber
90. Flush Chamber
91. Height
92. Thickness
93. Upper Edge
94. Arrow
95. Section
96. Section
97. Arrow
98. Insulating Member
99. Insulating Member
100. Spacing
101. Side Surface
102. Side Surface
103. Duct
104. Height
105. Flow Duct
106. Flow Duct
107. Flow Duct
108. Flow Duct
109. Flow Duct
110. Flow Duct
111. Thickness
112. Insulating Member
113. Support Baffle
114. Support Baffle
115. Support Baffle
116. Support Baffle
117. Support Baffle
118. Flow Duct
119. Flow Duct
120. Flow Duct
121. End Region
122. End Region
123. Cooling Member
124. Cooling Pipe
125. Cooling Fin
126. Coolant
127. Feed Pipe
128. Discharge Pipe
129. Cooling Member
130. Feed Pipe
131. Discharge Pipe
132. Cooling Member
133. Feed Pipe
134. Discharge Pipe
135. Cooling Member
136. End Face
137. Feed Pipe
138. End Face
139. Discharge Pipe
140. Collecting Container
141. Conveying Pump
142. Cooling Device
143. Lower Edge
144. Projection
145. Thickness
146. Seal Member
147. Cooling Member
148. Width
149. Height
150. Upperside
151. Space Height
152. Partition Wall
153. Partition Wall
154. Partition Wall
155. Partition Wall
156. Partition Wall
157. Partition Wall
158. Periphery
159. Wall Thickness
160. Hollow Chamber
161. Web
162. Web
163. Web
164. Web
165. Web
166. Web
167. Chamber
168. Chamber
169. Chamber
170. Chamber
171. Chamber
172. Chamber
173. Wall Thickness
174. Arrow
175. Evacuation Device
176. Line
177. Pipe Connection 178. Tube
179. Partition Wall
180. Partition Wall
181. Partition Wall
182. Partition Wall
183. Partition Wall
184. Pipe Connection
185. Tube
186. Tube
187. Longitudinal Web
188. Aperture
189. Aperture
190. Circulating Device
191. Heat Exchanger
192. Pipe
193. Vacuum Pump
194. Control Device
195. Pipe
196. Pipe
197. Pipe
198. Pipe
199. Measurement Conversion Device
200. Sensor
201. Pipe
202. Sensor
203. Pipe
204. Sensor
205. Pipe
206. Pipe
207. Pipe
208. Cooling Member
209. Injector Device
210. Discharge Pipe
211. Condenser
212. Heat Exchanger
213. Supply Container
214. Pipe

What is claimed is:

1. A method for cooling an elongated extruded plastic article to a temperature lower than an initial temperature thereof while advancing the article in a longitudinal direction, comprising:

advancing the article through an inner space defined within a casing that is divided by support raffles into a plurality of consecutive flow areas including an inlet area at one end of the casing and an outlet area at an opposite end of the casing, the article being passed into the inlet area and through apertures in the support baffles into the consecutive flow areas, and being discharged from the outlet area;

dividing the consecutive flow areas by at least one web extending in the longitudinal direction into chambers arranged at respective lateral sides of the article, the web extending to a position adjacent to but spaced by a distance from a surface of the article such that a slot is defined between said surface of the article and an opposing surface of the web, said slot enabling flow therethrough between chambers on opposite sides of the web so as to cool said surface of the article;

circulating a gaseous cooling medium through the consecutive flow areas by delivering the cooling medium to the inlet area and removing the cooling medium from the outlet area;

additionally cooling the gaseous cooling medium to a temperature less than 100° C. during circulation of the gaseous cooling medium through at least one of the consecutive flow areas; and exposing the advancing article to a gradually increasing vacuum in the consecutive flow areas.

2. Method according to claim 1, characterised in that in the individual flow areas which extend in a plane vertical to the extrusion direction, the cooling medium flows round the article in a first flow area in the circumferential direction, whereafter the cooling medium is conveyed onwards into a flow area directly following in the extrusion direction, and in this the cooling medium again flows round the article in the circumferential direction.

3. Method according to claim 1, characterised in that the flow direction of the gaseous cooling medium is aligned identically in flow areas directly succeeding one another.

4. The method according to claim 1, characterised in that the flow direction of the gaseous cooling medium in each flow area is aligned in an opposite direction to the flow direction of the gaseous cooling medium in the immediately preceding flow area.

5. Method according to claim 1, characterised in that the increase in the vacuum between the immediately successive flow areas take place continuously and is higher by 0.002 bar –0.1 bar in the extrusion direction in the successive flow area relative to the immediately preceding flow area.

6. Method according to claim 1, characterised in that the article is exposed in the entry area to a vacuum between 0 bar and –0.1 bar and in the outlet area to a vacuum between –0.01 bar and –0.5 bar.

7. Method according to claim 1, characterised in that the cooling medium is passed through the cooling device at a speed between 0.001 m/sec and 0.3 m/sec.

8. Method according to claim 1, characterised in that a flow speed of the flowing medium in the flow area is less than in the area of a pipe connection between two flow areas.

9. Method according to claim 1, characterised in that the cooling medium entering the flow area is separated from the cooling medium leaving the flow area. by one embodiment of the invention in which the article, during its continuous forward progress, has only a gaseous cooling medium at a temperature.

10. The method according to claim 1, wherein a slot is defined between the article and the longitudinal web in each of the flow areas, a portion of the cooling medium that flows around the article passing through the slot.

11. Method according to claim 1, characterised in that the cooling medium flows successively through the individual flow areas succeeding one another in the extrusion direction.

12. Method according to claim 1, characterised in that the cooling medium is cooled to a temperature of less than 0° C.

13. Method according to claim 1, characterised in that the cooling medium is cooled while in the circulating flow areas with a coolant at a temperature of less than 0° C.

14. Method according to claim 1, characterised in that the cooling medium is cooled outwith the flow areas.

15. Method according to claim 1, characterised in that the cooling medium is passed from the last flow area lying in the extrusion direction, if necessary with cooling, back to the flow area lying nearest to the extrusion tool.

16. Method according to claim 1, characterised in that a flow speed of the cooling medium is higher than a feed speed of the article in the extrusion direction.

17. Method according to claim 1, characterised in that the cooling medium flows round the article in the extrusion direction in a roughly spiralling form.

18. Method according to claim 1, characterised in that a vacuum is built up in the flow areas, and the cooling medium present in the evacuated area, independently of the generation and maintenance of the vacuum, is circulated a number of times in a predetermined period, the circulated quantity of cooling medium corresponding to a multiple of the quantity of cooling medium transported through the flow areas in order to maintain the vacuum.

19. Method according to claim 1, characterised in that the quantity of cooling medium circulated in the evacuated flow areas comes to between 50 m³/h and 600 m³/h.

20. Method according to claim 1, characterised in that the article has the cooling medium flowing round it with a turbulent flow in the area of its outer surface.

21. Method according to claim 1, characterised in that the cooling medium flows on and/or around the article in the flow areas in an angular, particularly transverse fashion relative to the extrusion direction.

22. Method according to claim 1, characterised in that a gaseous medium is passed contrary to the extrusion direction in the interior of the article.

23. Method according to claim 1, characterised in that, during cooling of the article a high temperature drop is achieved between an outer and an inner lateral area of a periphery of the article, between −40° C. in the outer lateral area and +90° C. in the inner lateral area.

24. The method according to claim 1, characterised in that the article is passed into the casing through an entry area thereof and is discharged from the casing through an exit area thereof, and wherein the cooling medium is passed into the inlet area in the entry area of the article to the flow area and thereupon is conveyed through the casing, and is extracted therefrom in the outlet area close to the exit area of the article from the casing, and if necessary with heat removal is passed again to the inlet area and in addition extraneous air entering from the flow areas located in the entry and exit area is extracted in order to adjust the vacuum build-up in the flow areas.

25. Device for cooling elongate extruded articles of plastic comprising a casing defining at least one cooling chamber, the casing including end walls, a base plate, side walls and a cover plate, the casing being subdivided by a plurality of support baffles into a plurality of flow areas located one behind the other in a longitudinal direction, the support baffles and the end walls each being provided with an aperture which corresponds to a cross-sectional shape or profile contour of the article, and wherein a cooling medium flows successively through the flow areas and at least two flow areas are connected together in the longitudinal direction by a pipe connection, and a flow area is connected by a discharge pipe to a vacuum pump, and in that each of the flow areas is subdivided by a longitudinal web between the article and the casing into at least two sections and the sections on the side of the article lying opposite the longitudinal web are connected together by a duct, characterised in that the cooling medium is formed by a gas and a cooling device for the cooling medium is located in the casing, and an inflow temperature of the cooling medium into the flow area is less than 100° C., and the two sections are located in the flow area parallel to one another extending in the longitudinal direction, one of the two sections being connected via a pipe connection either with a section of an immediately preceding flow area or with a feed pipe, and the other section being connected to a section of a succeeding flow area or to a discharge pipe.

26. Device according to claim 25, characterised in that insulating members are located in the inner space of the casing.

27. Device according to claim 25, characterised in that a spacing between an outer surface of the article and inner surfaces of the cooling chamber is roughly of equal size at least over a part area at least over a larger portion of the profile contour of the article between the two sections.

28. Device according to claim 27, characterised in that the spacing comes to between 1.0 mm and 20.0 mm in a plane lying vertical to the extrusion direction.

29. Device according to claim 25, characterised in that there are associated both with the side walls and also with at least one of the cover plate and the base plate of the casing, further insulating members at outer surfaces of the casing.

30. Device according to claim 25, characterised in that a plurality of flow areas are located in the longitudinal direction parallel to one another over the profile contour of the article between two support baffles located in succession in the longitudinal direction.

31. Device according to claim 25, characterised in that the flow areas are separated from one another between the casing and the article by a plurality of longitudinal webs.

32. Device according to claim 25, characterised in that a cooling member is disposed within the casing proximate the article.

33. Device according to claim 25, characterised in that the pipe connection between two flow areas lying one behind the other in the longitudinal direction is formed by a flow duct.

34. Device according to claim 33, characterised in that there is located in the flow duct a cooling member of the cooling device for the cooling medium.

35. Device according to claim 25, characterised in that the longitudinal web is in the form of a cooling member.

36. Device according to claim 25, characterised in that a cooling member of the cooling device is located in each of the two sections.

37. Device according to claim 25, characterised in that the cooling member of the cooling device is located between two support baffles defining the flow area (25–35').

38. Device according to claim 25, characterised in that a cooling member of the cooling device extends in the longitudinal direction over a plurality of flow areas located on behind the other.

39. Device according to claim 25, characterised in that the pipe connection is formed by an aperture between a separating wall, the support baffle and the casing.

40. Device according to claim 25, characterised in that a vacuum between the individual flow areas continuously increases from the entry area to the exit area.

41. Device according to claim 25, characterised in that the vacuum in one flow area immediately subsequent to a flow area in the extrusion direction is higher by 0.002 bar to 0.1 bar.

42. Device according to claim 25, characterised in that the vacuum in the entry area comes to between 0 bar and −0.1 bar, and in the exit area to between −0.1 bar and −0.5, bar.

43. Device according claim 25, characterised in that a flow speed of the cooling medium through the cooling device comes to between 0.001 m/sec and 0.3 m/sec.

44. Device according to claim 25, characterised in that the cooling medium has in the flow area a temperature of less than 0° C.

45. Device according to claim 25, characterised in that at least one of the support baffles and the base plate of the casing are made of steel.

46. Device according to claim 25, characterised in that the side walls and the cover plate of the casing as well as the longitudinal web and the separating walls are made of plexiglas.

47. Device according to claim 32, characterised in that the cooling member is filled with a coolant.

48. Device according claim 47, characterised in that the cooling member is formed by a cooling tube for a coolant, with cooling fins mounted on the cooling tube.

49. Device according to claim 25, characterised in that there is located in an end wall extending vertically an inlet for a suction pipe connected to the suction inlet of an evacuation device.

50. Device according claim 49, characterised in that the suction pipe is passed through an extrusion tool with an interposed heat insulation.

51. Device according to claim 50, characterised in that the inlet into the suction pipe is located at a spacing in front of a nozzle lip of the extrusion tool.

* * * * *

UNITED STATES PATENT AND TRADEMARK OFFICE
CERTIFICATE OF CORRECTION

PATENT NO. : 6,066,288
DATED : May 23, 2000
INVENTOR(S) : Pürstinger

It is certified that error appears in the above-identified patent and that said Letters Patent is hereby corrected as shown below:

Title page,
Item [73], in the Assignee's name, "mbH." should read -- m.b.H. --.

Column 1,
Line 5, after the title and before "SUMMARY OF THE INVENTION", insert the following: -- FIELD OF THE INVENTION
The invention relates to a method and a device for cooling and if necessary calibrating elongate extruded articles of plastic.

BACKGROUND OF THE INVENTION
A method of cooling and if necessary calibrating elongate continuously extruded articles of plastic is already known, according to DE 195 04 981 A1 of the same applicant. In this method and the associated device, the article to be cooled and calibrated is exposed in successive partial areas of its external surface to a variable vacuum during its continuous movement in the longitudinal or extrusion direction. Cooling in the successive areas with variable vacuum is effected by a liquid cooling medium flushing round the article, by means of which the heat to be removed for cooling the article is extracted. The various areas are subdivided from one another by baffles located in a plane aligned vertically to the extrusion direction, by means of which the article passes through apertures or openings adapted to its external periphery. The cooling medium is conveyed through these areas by the vacuum increasing in the extrusion direction in the successive areas, and flows substantially transversely or obliquely to the extrusion direction over a majority of the surface of the article. Despite the contact improved thereby and a higher exchange of the quantity of liquid coolant coming directly into contact with the article, the cooling of the article achieved is not sufficient in all cases of application. Further known, similar methods and devices are also described in EP 0 659 536 A2, EP 0 659 537 A2, DE 19 36 428 A, EP 0 487 778 B1. --.

Column 35,
Line 44, "raffles" should read -- baffles --.

UNITED STATES PATENT AND TRADEMARK OFFICE
CERTIFICATE OF CORRECTION

PATENT NO.   : 6,066,288
DATED        : May 23, 2000
INVENTOR(S)  : Pürstinger

It is certified that error appears in the above-identified patent and that said Letters Patent is hereby corrected as shown below:

Column 36,
Lines 36-39, after "area." cancel "by one embodiment of the invention in which the article, during its continuous ward progress, has only a gaseous cooling medium at a temperature.";
Line 50, "in the circulating" should read -- circulating in the --.

Signed and Sealed this

Ninth Day of October, 2001

Attest:

NICHOLAS P. GODICI
Attesting Officer   Acting Director of the United States Patent and Trademark Office